United States Patent [19]

Lawrence et al.

[11] Patent Number: 5,519,866
[45] Date of Patent: May 21, 1996

[54] METHOD AND APPARATUS OF INCREMENTALLY LINKING COMPONENTS OF A MODELED COMPUTER PROGRAM

[75] Inventors: Roger P. Lawrence; John R. Dance, both of Cupertino, Calif.

[73] Assignee: Taligent, Inc., Cupertino, Calif.

[21] Appl. No.: 85,490

[22] Filed: Jun. 28, 1993

[51] Int. Cl.⁶ .............................. G06F 9/30; G06F 15/00
[52] U.S. Cl. ................... 395/700; 364/280.4; 364/262.4; 364/262.5; 364/DIG. 1
[58] Field of Search ..................................... 395/700, 650

[56] References Cited

U.S. PATENT DOCUMENTS

| | | | |
|---|---|---|---|
| 4,558,413 | 12/1985 | Schmidt et al. | 395/600 |
| 4,589,068 | 5/1986 | Heinen, Jr. | 364/300 |
| 4,809,170 | 2/1989 | Leblang et al. | 364/200 |
| 4,910,663 | 3/1990 | Bailey | 200/20 |
| 4,943,932 | 7/1990 | Lark et al. | 364/513 |
| 4,953,084 | 8/1990 | Meloy et al. | 364/200 |
| 5,124,989 | 6/1992 | Padawer et al. | 371/19 |
| 5,129,086 | 7/1992 | Coyle, Jr. et al. | 395/650 |
| 5,140,671 | 8/1992 | Hayes et al. | 395/76 |
| 5,170,465 | 12/1992 | McKeeman et al. | 395/700 |
| 5,175,856 | 12/1992 | Van Dyke et al. | 395/700 |
| 5,182,806 | 1/1993 | McKeeman et al. | 395/700 |
| 5,187,789 | 2/1993 | O'Hair | 395/700 |
| 5,193,190 | 3/1993 | Janczyn et al. | 395/700 |
| 5,193,191 | 3/1993 | McKeeman et al. | 395/700 |
| 5,201,050 | 4/1993 | McKeeman et al. | 395/700 |
| 5,204,960 | 4/1993 | Smith et al. | 395/700 |

FOREIGN PATENT DOCUMENTS

| | | |
|---|---|---|
| 406028 | 1/1991 | European Pat. Off. . |
| 546684 | 6/1993 | European Pat. Off. . |
| 2242293 | 9/1992 | United Kingdom . |

OTHER PUBLICATIONS

11th Anual Phoenix Conf. on Computers and Communcations Apr. 1, 1992, IEEE New York, US, pp. 531–538, V. Ramji et al. "Distributed and Optimistic Make: Implementation and Performance".

Software Practice & Experience, V. 21(4), Apr. 4, 1991, Chichester, GB, pp. 375–390, W. Wilson et al. "An Approach to Genuine Dynamic Linking".

*Primary Examiner*—Kevin A. Kriess
*Assistant Examiner*—John O. Chavis
*Attorney, Agent, or Firm*—Keith Stephens

[57] ABSTRACT

A human oriented object programming system provides an interactive and dynamic process for the incremental building of computer programs which facilitates the development of complex computer programs such as operating systems and large applications with graphic user interfaces (GUIs). The program is modeled as a collection of units called components. A component represents a single compilable language element such as a class or a function. The major functionalities are the database, the compiler, build and link mechanism. The database stores the components and properties. The compiler, along with compiling the source code of a property, and generating object code is responsible for calculating the dependencies associated with a component. The build mechanism uses properties of components along with the compiler generated dependencies to correctly and efficiently sequence the compilation of components during a build process. The link mechanism links all object code as the component stores it in the component database. Only updated components require linking operations.

18 Claims, 30 Drawing Sheets

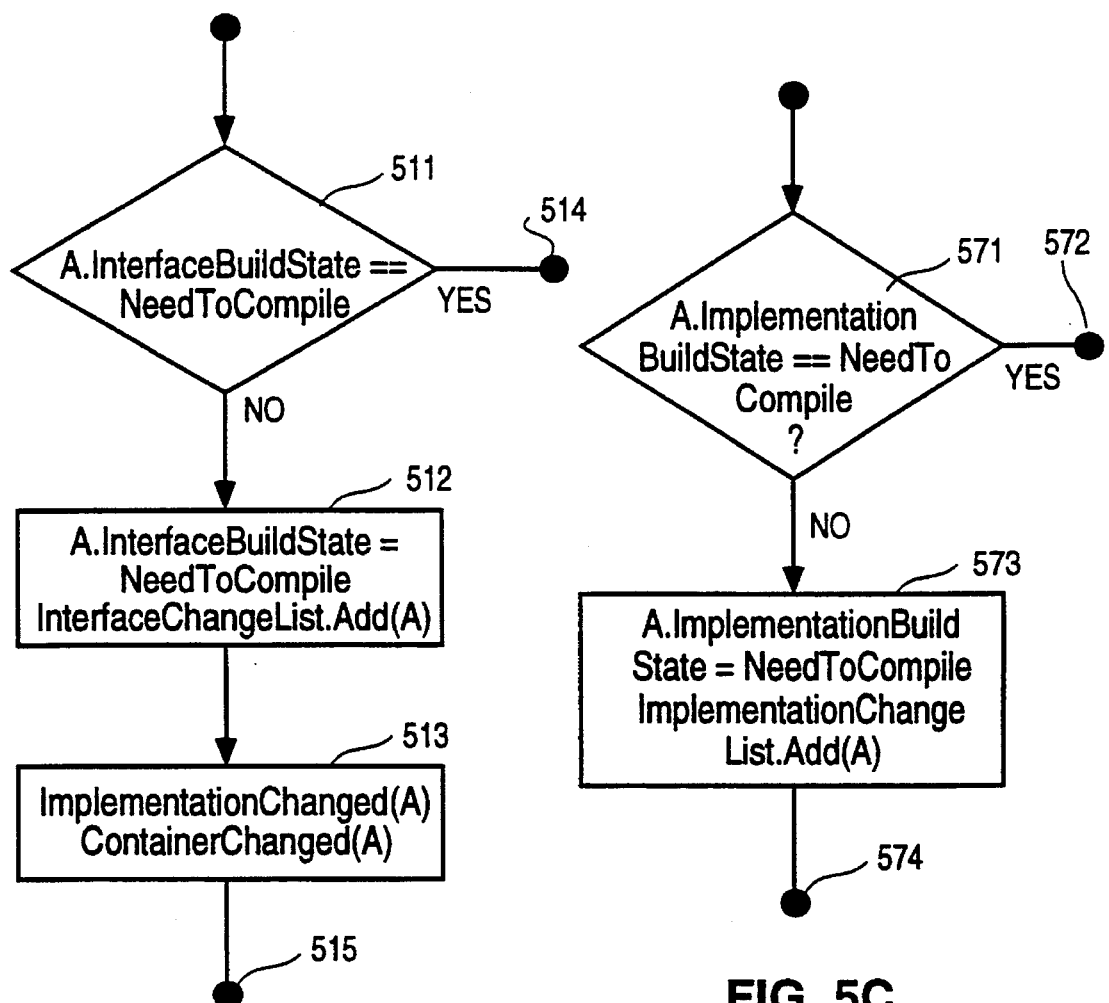
FIG. 5B
FIG. 5C
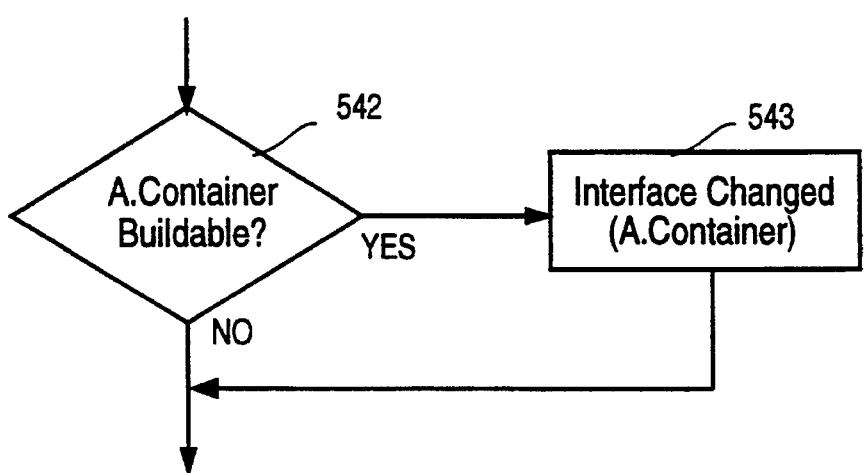
FIG. 5D

| Reference Type | Example | Address returned @ link time | Result | |
|---|---|---|---|---|
| code-to-code | Foo(); | j_Foo | code:<br>linkage: | bsr j_Foo<br>j_Foo: bra Foo |
| code-to-data (external) | gVal = 1; | r_gVal | code:<br><br><br>linkage: | movea r_gVal(pc),a0<br>move (a0), a0<br>move #1,(a0)<br>r_gVal: &gVal |
| code-to-data (internal) | gVal = 1; | gVal | code: | movea gVal(pc),a0<br>move #1, a0 |
| data-to-data | int& pi = i; | 0 | data: | pi: (i @ load time) |
| data-to-code | void (*pnf)() = &Foo; | 0 | data: | pnf: (j_Foo @ load time) |

FIG. 25

METHOD AND APPARATUS OF INCREMENTALLY LINKING COMPONENTS OF A MODELED COMPUTER PROGRAM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED PATENT APPLICATIONS

This patent application is related to the U.S. Pat. No. 5,369,766 entitled Loader System, by Russell Nakano, and Andrew G. Heninger, assigned to Taligent, the disclosure of which is hereby incorporated by reference.

FIELD OF THE INVENTION

The present invention generally relates to computer aided software engineering (CASE) and, more particularly, to human oriented object programming system (HOOPS) which provides an interactive and dynamic environment for computer program building. HOOPS allows a programmer to perform fine granularity source code editing in a computer program with an optimizing incremental compiler. The subject invention is an incremental linker which operates inside HOOPS to create files that are used by a loader. The invention is disclosed in terms of a preferred embodiment which uses a popular object oriented programming (OOP) language, C++, but the principles are applicable to other computer programming languages both object oriented and procedural and may be used to build programs using both conventional and OOP languages.

BACKGROUND OF THE INVENTION

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Machintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is a class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O. J. Dahl, B. Myhrhaug and K. Nygard of Norway. Further information on the subject of OOP may be had by reference to *Object Oriented Design with Applications* by Grady Booch, The Benjimin/Cummings Publishing Co., Inc., Readwood City, Calif. (1991).

The complete process of running a computer program involves translation of the source code written by the programmer to machine executable form, referred to as object code, and then execution of the object code. The process of translation is performed by an interpreter or a compiler. In the case of an interpreter, the translation is made at the time the program is run, whereas in the case of a compiler, the translation is made and stored as object code prior to running the program. That is, in the usual compile and execute system, the two phases of translation and execution are separate, the compilation being done only once. In an interpretive system, such as the Smalltalk interpreter, the two phases are performed in sequence. An interpreter is required for Smalltalk since the nature of that programming environment does not permit designation of specific registers or address space until an object is implemented.

A compiler comprises three parts; the lexical analyzer, the syntax analyzer, and the code generator. The input to the lexical analyzer is a sequence of characters representing a high-level language program. The lexical analyzer divides this sequence into a sequence of tokens that are input to the syntax analyzer. The syntax analyzer divides the tokens into instructions and, using a database of grammatical rules, determines whether or not each instruction is grammatically correct. If not, error messages are produced. If correct, the instruction is decomposed into a sequence of basic instructions that are transferred to the code generator to produce a low-level language. The code generator is itself typically divided into three parts; intermediate code generation, code optimization, and code generation. Basically, the code generator accepts the output from the syntax analyzer and generates the machine language code.

To aid in the development of software, incremental compilers have been developed in which the compiler generates code for a statement or a group of statements as received, independent of the code generated later for other statements, in a batch processing operation. The advantage of incremental compiling is that only the code affected by a change is compiled. This action results in much faster turn-around times for compiling and debugging code.

Optimizing compilers produce highly optimized object code which, in many cases, makes debugging at the source level more difficult than with a non-optimizing compiler. The problem lies in the fact that although a routine will be compiled to give the proper answer, the exact way it computes that answer may be significantly different from that described in the source code. Some things that the optimizing compiler may do include eliminating code or variables known not to affect the final result, moving invariant code out of loops, combining common code, reusing registers allocated to variables when the variable is no longer needed, etc. Thus, mapping from source to object code and vice versa can be difficult given some of these optimizations. Inspecting the values of variables can be difficult since the value of the variable may not always be available at any location within the routine. Modifying the values of variables in optimized code is especially difficult, if not impossible. Unless specifically declared as volatile, the compiler "remembers" values assigned to variables and may use the "known" value later in the code without rereading the variable. A change in that value could, therefore, produce erroneous program results.

While there have been many advances in the art of computer program building, testing and developing, the known software development tools still place a substantial burden on the programmer, often requiring insightful intuition. In addition, traditional batch oriented programming systems provide for very long edit-compile-test cycles which is very disruptive to the creative act of programming.

Once compilation is completed in conventional programming systems, the application must still be linked and loaded. A program called a linker makes a single program from several files of relocatable machine code. These files may have been the result of several compilations. The program is then loaded, consisting of: taking relocatable machine code, altering the relocatable addresses and placing the altered instructions and data in memory at the proper locations.

SUMMARY OF THE INVENTION

It is therefore an object of the present invention to provide an incremental linker which operates within a human oriented, interactive and dynamic process for the building of computer programs.

In the interactive dynamic build process, program building is made possible by the interaction of an incremental program model, called a project, and three major functionalities. A program is modeled as semantic units called components made up of a list of named data items called properties. Rather than storing a program as a loose collection of files as is done in traditional systems, the human oriented object programming system (HOOPS) of the invention stores all the information about the program in the project. The computer builder process promotes better programmer focus and concentration, and hence greater productivity.

According to the invention, there is provided an incremental linking facility which functions within HOOPS and wherein functions are linked into existing executables, thereby avoiding reprocessing of an entire set of object flies. In the practice of the invention, a computer program is modeled as a collection of components. The components that provide the model for a computer program are stored for access during the build process. The stored components are accessed in sequence and, using a compiler, dependencies associated with each component are calculated to develop a list of dependencies. The components are then compiled based on the list of dependencies to generate an updated object module. Finally, the updated object module is linked by updating an existing executable file.

The preferred embodiment of the invention is written in C++ and is used to build programs in C++, C and Assembler, these being the most popular languages currently in use. The programs built using the invention typically use all three of these languages. Thus, while the invention is itself an object oriented program written in an object oriented programming language, it is not limited to building programs in object oriented programming languages but is equally useful in building programs in procedural languages. Moreover, the invention is not limited to the C++ language, but may be implemented in other programming languages, and the invention is not limited in its application to these three languages; that is, the teachings of the invention may be used in a human oriented object programming system of more general application.

BRIEF DESCRIPTION OF THE DRAWINGS

The foregoing and other objects, aspects and advantages will be better understood from the following detailed description of a preferred embodiment of the invention with reference to the drawings, in which:

FIGS. 5A to 5D, taken together, are a flowchart of the logic of registering editing changes through BuildStates;

FIG. 13 is a pictorial representation of the computer screen shown in FIG. 12 with the browser wiring turned on;

FIG. 25 illustrates different types of references and linker modification of the references in accordance with a preferred embodiment.

DETAILED DESCRIPTION OF A PREFERRED EMBODIMENT OF THE INVENTION

Figure 1:
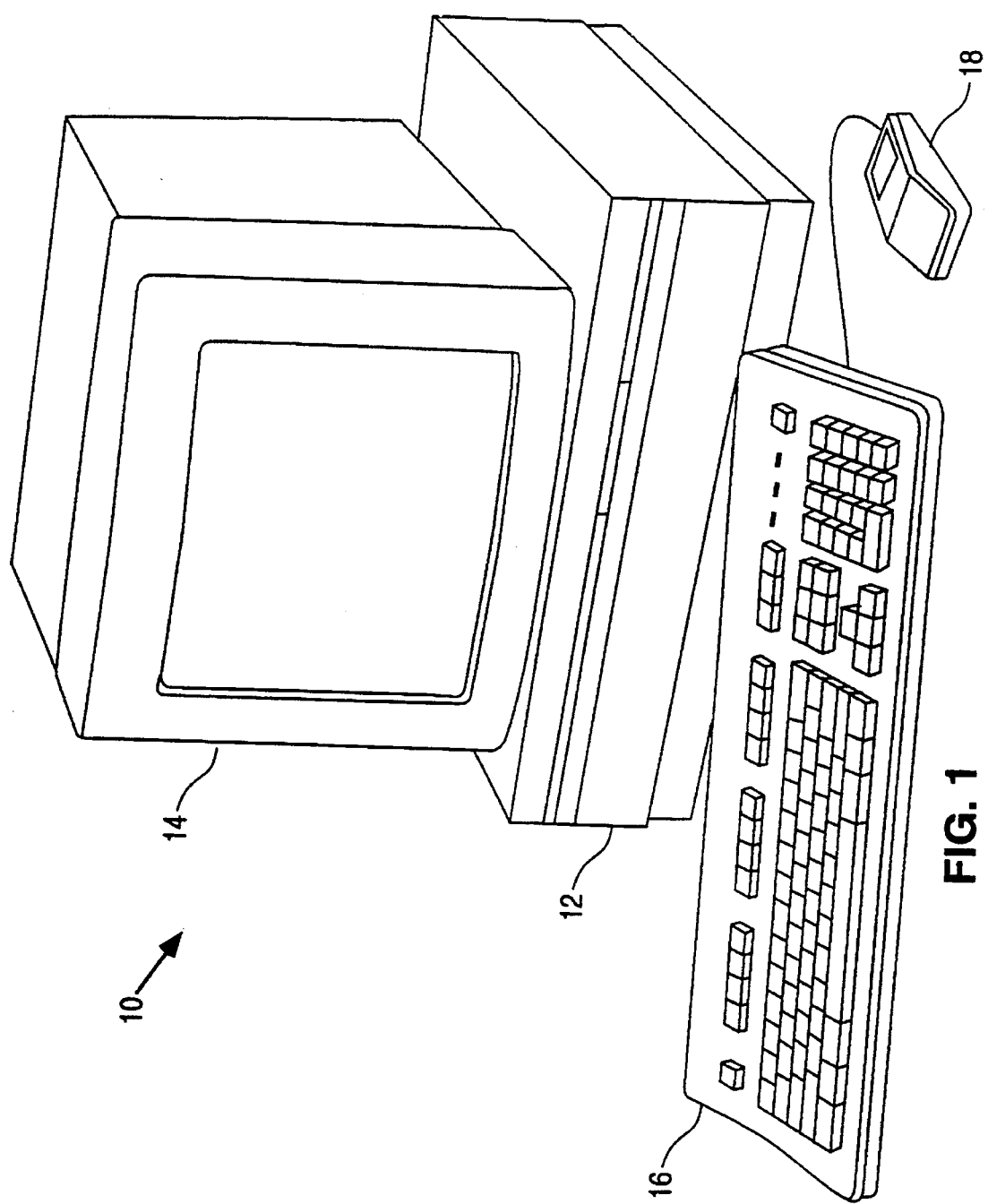
FIG. 1 is a pictorial diagram showing a general purpose computer system capable of supporting a high resolution graphics display device and a cursor pointing device, such as a mouse, on which the invention may be implemented.

Referring now to the drawings, and more particularly to FIG. 1, there is shown a general purpose computer 10. The computer 10 has a system unit 12 a high resolution display device 14, such as a cathode ray tube (CRT) or, alternatively, a liquid crystal display (LCD). The type of display is not important except that it should be a display capable of the high resolutions required for windowing systems typical of graphic user interfaces (GUIs). User input to the computer is by means of a keyboard 16 and a cursor pointing device, such as the mouse 18. The mouse 18 is connected to the keyboard 16 which, in turn, is connected to the system unit 12. Alternatively, the mouse 18 may be connected to a dedicated or serial port in the system unit 12. Examples of general purpose computers of the type shown in FIG. 1 are the Apple Macintosh® (registered trademark of Apple Computer) and the IBM PS/2. Other examples include various workstations such as the IBM RISC System/6000 and the Sun Microsystems computers.

Figure 2:
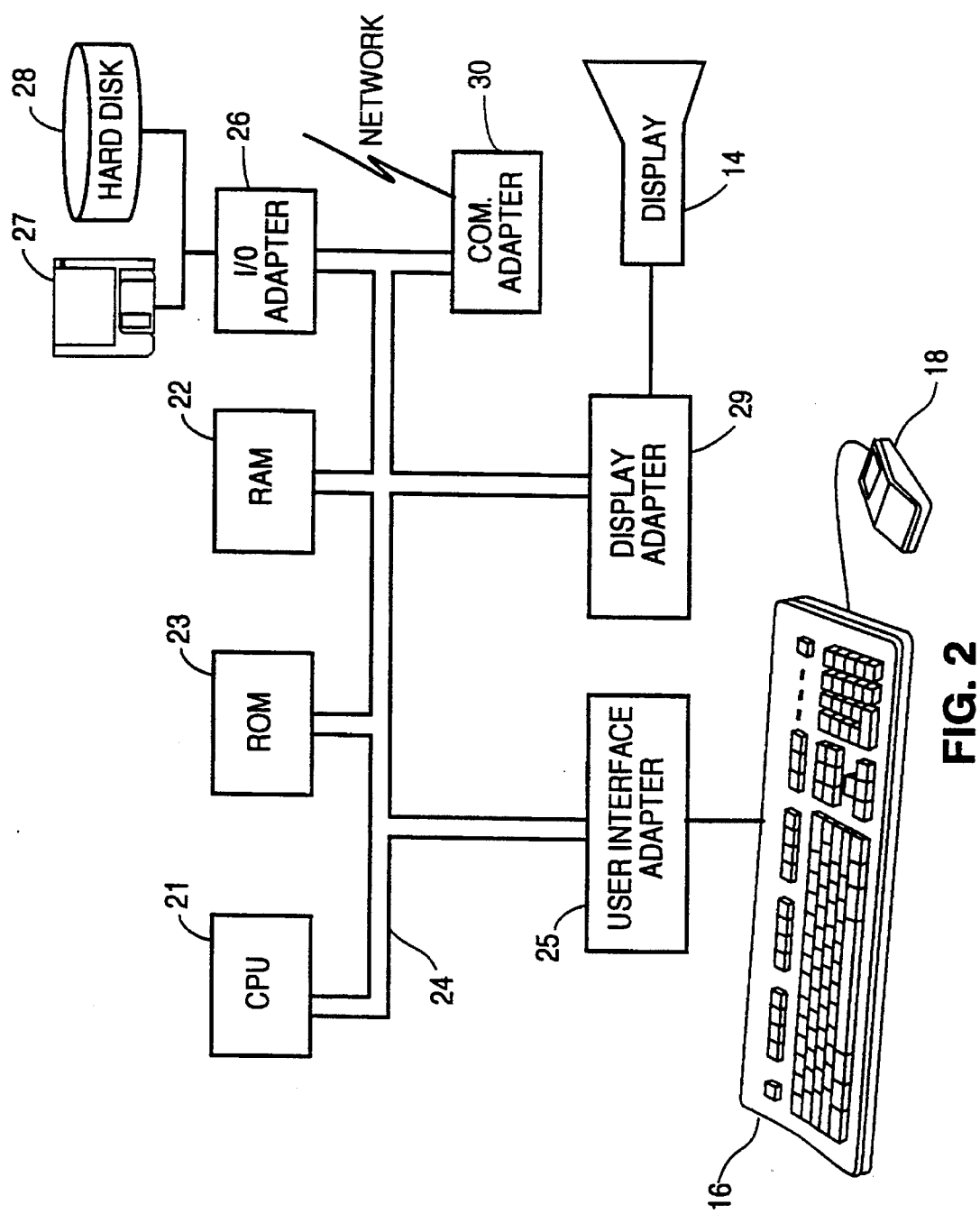
FIG. 2 is a block diagram of the general purpose computer system illustrated in FIG. 1 showing in more detail the principle elements of the computer system.

FIG. 2 illustrates in more detail the principle elements of the general purpose computer system shown in FIG. 1. The system unit 12 includes a central processing unit (CPU) 21, random access memory (RAM) 22, and read only memory (ROM) 23 connected to bus 24. The CPU 21 may be any of several commercially available microprocessors such as the Motorola 68030 and 68040 microprocessors commonly used in the Apple Macintosh® computers or the Intel 80386 and 80486 microprocessors commonly used in the IBM PS/2 computers. Other microprocessors, such as RISC (for reduced instruction set computer) microprocessors typically used in workstations, can also be used. The ROM 24 stores the basic microcode, including the basic input/output system (BIOS), for the CPU 21. The operating system (OS) for the computer system 10 may also be stored in ROM 24 or, alternatively, the OS is stored in RAM 22 as part of the initial program load (IPL). RAM 22 is also used to store portions of application programs and temporary data generated in the execution of the programs. The bus 24 may be the Apple NuBus®, the IBM MicroChannel® or one of the industry standards such as the ISA (industry standard adapter) or EISA (extended industry standard adapter) buses.

Also connected to the bus 24 are various input/output (I/O) adapters, including a user interface adapter 25 and an I/O adapter 26. The keyboard 16 is connected to the user interface adapter 25, and the I/O adapter 26 connects to a floppy disk drive 27 and a hard disk drive 28. The floppy disk drive 27 allows the reading and writing of data and programs to removable media, while the hard disk drive 28 typically stores data and programs which are paged in and out of RAM 22. The display device 14 is connected to the bus 24 via a display adapter 29. A communication adapter 30 provides an interface to a network. Other supporting circuits (not shown), in the form of integrated circuit (IC) chips, are connected to the bus 24 and/or the CPU 21. These would include, for example, a bus master chip which controls traffic on the bus 24. The bus 24 may, in some computers, be two buses; a data bus and a display bus allowing for higher speed display operation desirable in a graphic user interface.

Definitions

Program

As used in the description of the invention, a HOOPS program consists of one non-buildable component called the Project and a collection of "buildable components". It is also possible to store non-buildable components, but in this description, whenever an unqualified component is mentioned, what is meant is a "buildable component". Non-buildable components will not be compiled during a build operation.

Component

A component has a unique identity and is named. Different components are distinguished by some form of unique Identifier called an ID. There is a distinguished ID called NullID which belongs to no component. The ID is assigned when a component is created and is never changed during the existence of the component. If a component is deleted, its ID is never reused. In practice, IDs are usually numerical.

A component also has a name which consists of a string of text. There is no requirement that different components have different names. It is possible to obtain a list (possibly empty) of all components whose names match some given text string. A component's name may be changed any number of times during the existence of the component.

Each buildable component is associated with a specific computer language. In practice, the computer language is usually identified by a string of text. Each computer language has a compiler associated with it which is to be used when compiling any component with that language. In practice, it is possible for a given computer language to be associated with more than one compiler. In this case, the component must record both the language and some way of identifying the specific compiler.

A specific language has a specific set of component kinds associated with it and a specific set of property implementations, possibly differing for every kind. Thus, distinct semantic elements in a particular language may be structured in different ways according to need.

Components have BuildStates. A BuildState is a value from the list NeverCompile, Compiled, NeedToCompile, Uncertain, BeingCompiled, CompileError, and UncertainError. In practice, these values are usually numerical. Each component has a pair of BuildStates called InterfaceBuildState and ImplementationBuildState. Every component has both these buildstates whether it is buildable or non-buildable. For a non-buildable component, these BuildStates are both NeverCompile.

BuildStates may be accessed and changed. Setting a component's BuildState to the same value again is allowed and causes no effect. Changing a BuildState may have well defined side-effects such as changing the BuildState of another property of the same or a different component or, for example, adding or deleting references from some list such as a list of changes or a list of errors.

Components are used to represent semantic language elements. The way that this is done depends on the particular computer language being modeled. For example, in C++ a partial list of language elements represented by components includes global data, global functions, classes, data members, member functions, typedefs, enums, enumerators, macros, unions and structs. Typically, each semantic element will have an associated distinct kind.

Properties

A component consists of a collection of named properties. A property represents some data associated with the component. It is possible to retrieve or store data given a component's ID and a property name. In practice, property names are usually internally represented by numbers identifying the names (such numbers are sometimes called tokens). There is a distinguished property name called NullProperty which belongs to no property.

The data associated with a given property is different for different components. Changing the data for a given property for one component does not imply changing the data for the same property of any other component. However, it is possible for a change in one property of a component to cause a change in another property of the same or another component.

A pair consisting of an ID and a property name is called a reference. A reference uniquely identifies a particular piece of property data. Often a reference is loosely used as though it were the component and/or property to which it refers. In practice, a reference typically contains other information which is not used directly in program building, identifying which version of the data and which subsection of the data in the property is being referenced.

All components must have the properties Name and Container. The Name property stores the component's name. The Container property contains a single reference in which the property name is NullProperty. Starting from any component and successively replacing it with the component referred to by its Container ID will always eventually result in the Project component. The Container ID of the Project is NullID. Thus, all components are described as being in the Project.

The "Components Built" property (also called the components built list) records the list of properties correctly compiled in the last build, in the order that they were built. The same property should only appear at most once on this list. It is used for testing and debugging.

Project Component

A project is a component that has, in addition, the properties ChangeList and ErrorList. The ChangeList property is a list of references. The references describe the components and properties that have changed since the last build. In practice, the ChangeList may be represented by more than one list sorted in some fashion for efficiency in building a program. The ErrorList property is also a list of references. These references describe the components which were listed as having errors during the last program build. The references all have Errors as their property. Associated with each reference is a numerical key. This key is used in conjunction with the specified Errors property to locate a specific message and a particular subrange of specified property of the component.

Library Component

A library is a container for all buildable components. It has a property of "LoadModuleProperty" which is described in more detail below. There can be multiple library components in a project. Each buildable component must be contained by a library component.

Buildable Component

A buildable component must also have properties Declaration, ObjectCode, Clients, SourceReferences, Errors and may have properties Interface, Implementation, and Members.

The Declaration property represents a data cache for the compiler. This may be empty, as for example before the component has ever been compiled. In practice, it may be thought of as an entry in the compiler's symbol table, although the stored representation may differ from the compiler's internal representation.

The ObjectCode property represents the executable code for the component. This may be empty, as for example before the component has ever been compiled or because no object code is associated with this component. In practice, it usually provides a means of pointing at the actual code which is stored elsewhere.

The Clients and SourceReferences properties are collections of pairs consisting of a reference and a dependency. A dependency is a list of changes. A change may be represented as a string of text chosen from a distinguished finite list of strings. There is a distinguished change called Public which is used to distinguish references to a component in the Implementation property only, as opposed to uses in the Interface property. A dependency can be represented as a bit vector with the nth bit being "1" if the nth change in the list is present and "0" otherwise.

The Errors property consists of a list of triples. Each triple consists of a key, a property name, and a message. A key is a numerical identifier. A given key may appear only once in a particular Errors property at one time. The property name is usually Interface or Implementation. The message is some piece of text and/or graphics.

The Interface and Implementation properties are properties representing the source text of the component. The Source text may be stored as tokens rather than text and be accessed in different forms if required. The text represented by these properties may be changed by editing it manually in the programming environment. One possibility is for the Interface data to be stored as structured fields from which the source text can be reconstructed as required.

The Members property is the collection (possibly empty) of references, one for each component in the Project that has this component as its Container.

Attributes

A component has a number of attributes. An attribute is either True or False. In practice, an attribute is usually represented by a single bit of memory with the values True and False represented by the numbers "1" and "0". All components have the attribute IsBuildable. If this attribute is true, and the component is buildable; otherwise, it is non-buildable. A component may be always non-buildable or temporarily non-buildable (because of the action of some temporary condition).

Buildable components also have the attribute IsInline. When this attribute is True, the Implementation of a component is public, and this means that other components can be dependent on changes to the Implementation. If it is False, Implementation changes never cause changes in other components.

Buildable components also have the attribute IsSynthetic. This attribute is True for components that are created during the build process by the compiler. It is False for components created manually by the programmer. Synthetic components are provided to allow compilers to create components corresponding to default language elements that are required but do not need to be explicitly created by the programmer. In practice, it may be possible to change the IsSynthetic attribute from True to False, for example if a synthesized component is manually edited, but the reverse transformation from False to True is never allowed. Synthetic components often do not have an Interface or Implementation property, but in any case always have their Interface and Implementation BuildStates Compiled.

Kinds

Each component has a kind. A kind is a string of text which is used to classify components into groups sharing for example the same properties or the same language specific behavior. Most kinds are specific to a particular computer language and are used to designate semantically distinct language elements.

There are, however, some kinds defined by the system. These are the kinds Project, Library and Container. These kinds are only applied to non-buildable components. The Project kind is the kind of the Project component. The Library kind is applied to collections of components that are to be linked into a single external block of object code such as a shared library or application. The Container kind is applied to components which are used to group other components for organizational purpose. In practice, kinds are usually internally represented numerically.

Overview of the Invention

Figure 3:
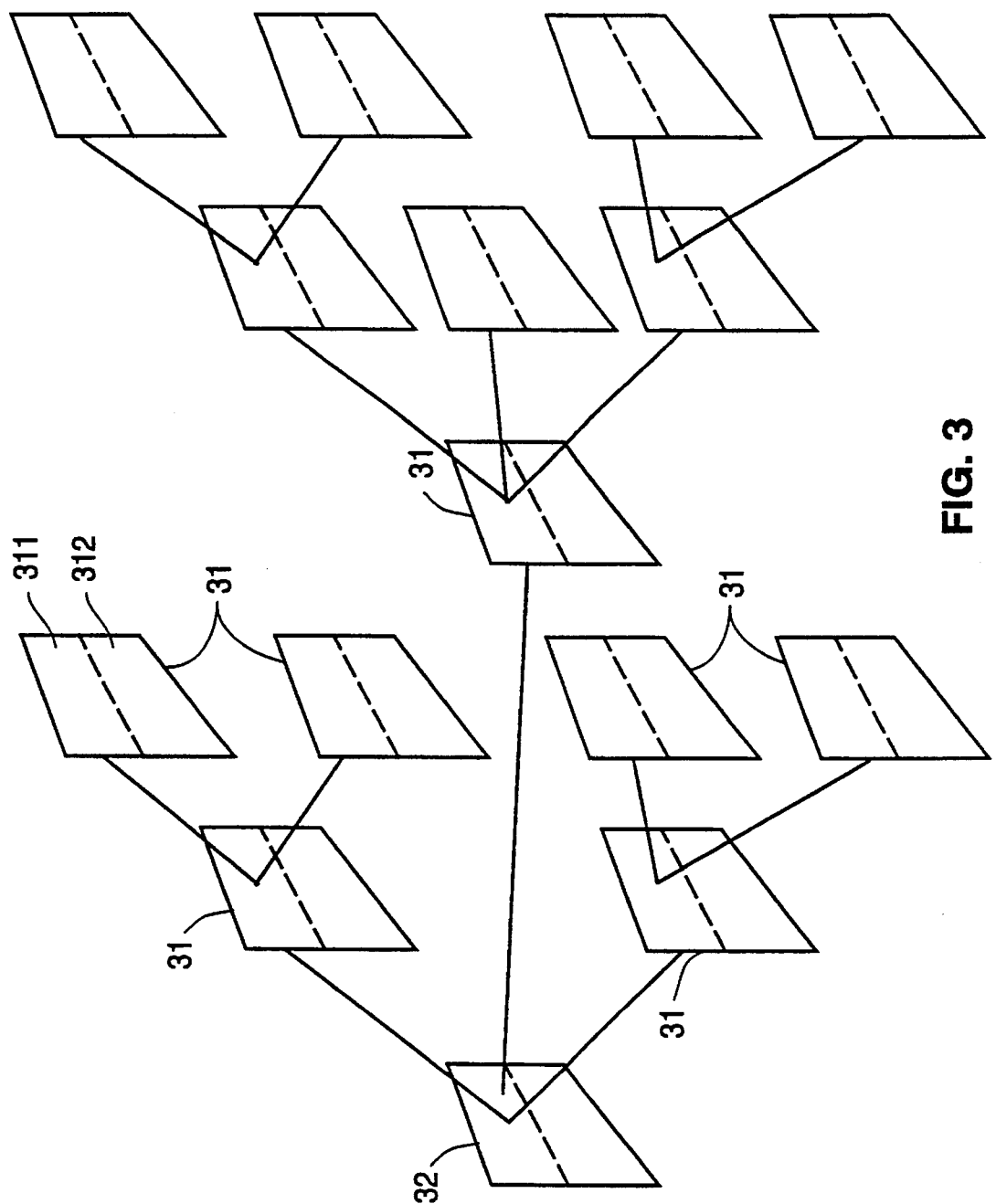
FIG. 3 is a block diagram showing in conceptual form a collection of components which compose a program.

FIG. 3 provides a conceptual representation of a program as composed of a set of components 31. Each component is composed of a set of properties which are divided into two parts, the externally visible (or public) part 311 called the Interface and the Implementation 312 (the private part). As shown in FIG. 3, components are dependent only on the interface of another component. All the components in a project are organized into a tree structure, with the base of the tree being a root component 32 called the project component. As will be understood by those skilled in the art, the components are not necessarily self-contained entities but may include pointers pointing to storage locations for actual code. Nevertheless, this tree-structured representation is useful in presenting the organization of a program and, therefore, a similar tree-structured representation is used in one of the user screens described hereinafter.

Figure 4:
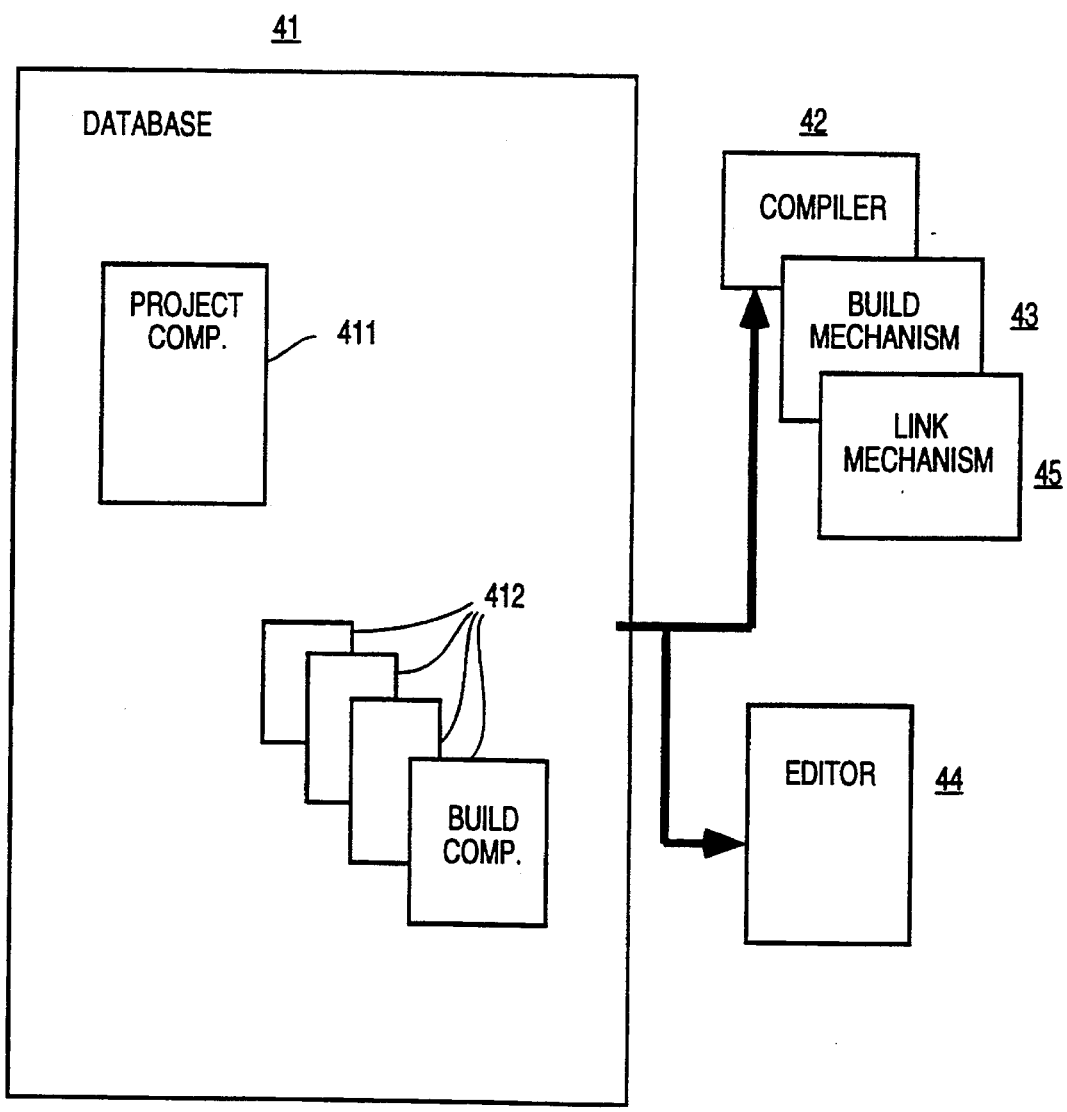
FIG. 4 is a block diagram showing the principle functionalities of the invention.

FIG. 4 is a block diagram showing the major functionalities of the invention. These are the database 41, the compiler 42, and the build mechanism 43. The database 41 is composed of a set of components, here shown as a project component 411 and a collection of buildable components 412 which model a program which is to be built. The compiler 42 calculates the dependencies associated with the components in the database 41. The build mechanism 43 uses properties of components along with compiler generated dependencies to build the program. A link mechanism 45 incrementally links updated components, and can even update loaded applications. The link mechanism collects the object code generated by the compiler into executable files.

A programmer changes the program by means of an editor 44. The editor must be capable of creating and deleting components, and typically of cutting, copying, pasting and moving components. The editor must be capable of changing the data in the Interface and Implementation properties usually by allowing direct modification of text, although other more structured approaches such as selection from menus are possible. In practice, the editor 44 will often consist of a number of editors, possibly as many as one for each type of Interface or Implementation property or possibly even for subfields of data in those properties.

Method For Registering Editing Changes

Figure 5A:
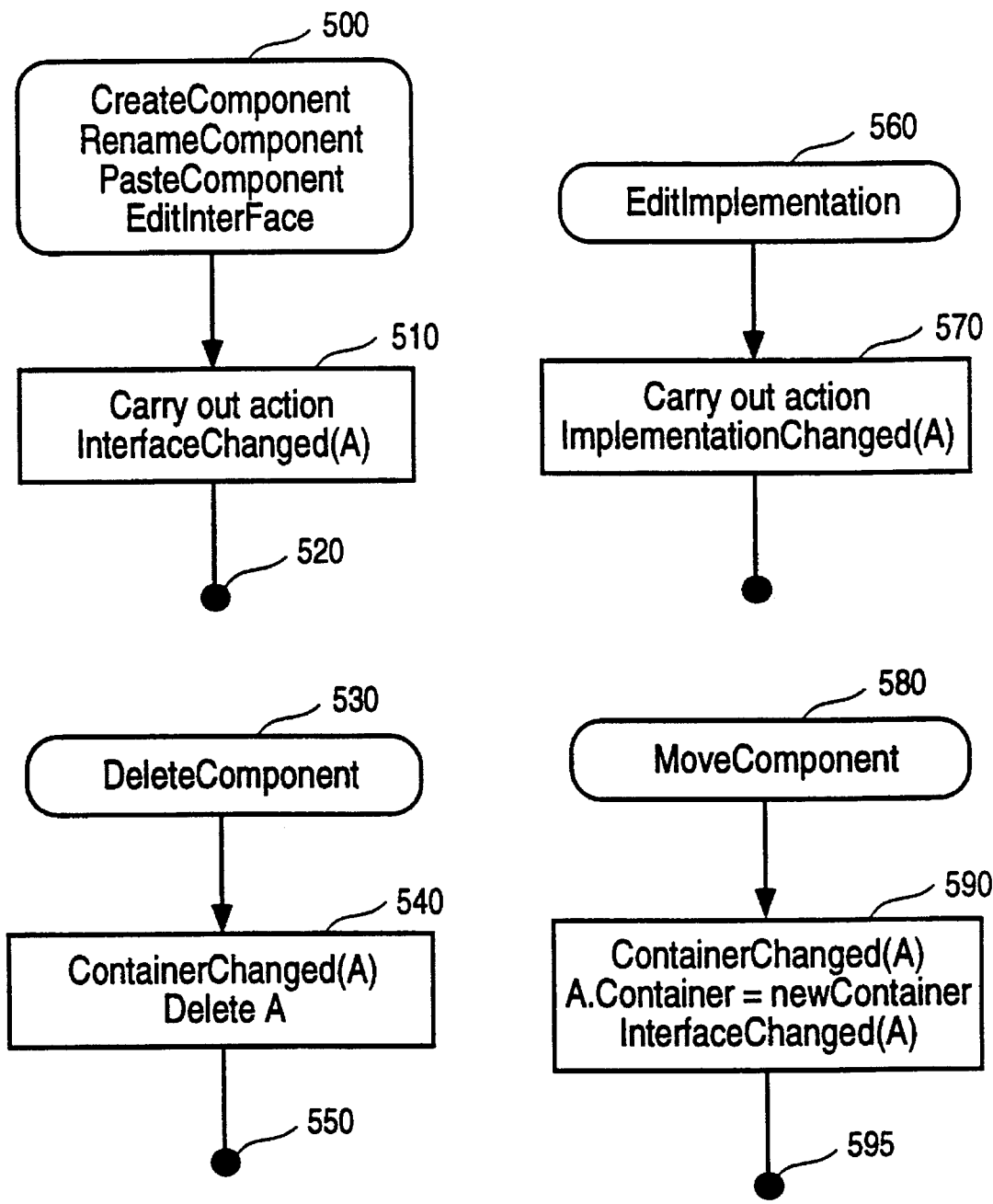

Reference is made to FIGS. 5A to 5D which show flowcharts illustrating the logic of the functions performed by the editor associated with incremental building 44. For buildable non-synthetic components, BuildStates are confined to the values Compiled and NeedToCompile outside the build process. If the Interface property is not present, the InterfaceBuildState is Compiled. If the Implementation property is not present, the ImplementationBuildState is Compiled. In FIG. 5A, the various editing state changes are presented. At label 500, when the system identifies a CreateComponent, RenameComponent, PasteComponent or EditInterface command, control passes to function block 510 to process the interface change. The detailed logic for the change is set forth in FIG. 5B.

In FIG. 5B, processing commences at decision block 511 where a test is performed to determine if the interface build state is NeedToCompile. If so, then control is passed via label 514 to continue editing. These actions take place during editing, not during the rebuild. The next action is most likely another editing action. If not, then at function block 512, the interface build state is set to NeedToCompile and the interface change list is updated accordingly. Then, at function block 513, the implementation changed and container changed processing is completed. The details of the implementation changed operation are presented in FIG. 5C and the container changed operations are detailed in FIG. 5D.

FIG. 5C sets forth the detailed processing associated with implementation changed. At decision block 571, a test is performed to determine if the implementation build state is already set to NeedToCompile. If so, then control is passed via label 572 to continue editing. If not, then at function block 573, implementation build state is set equal to NeedToCompile and implementation change list is updated accordingly. Then, control is passed back via label 574.

FIG. 5D sets forth the detailed logic associated with a container change operation. A test is performed at decision block 542 to determine if the variable is buildable. If so, then at function block 543, interface changed is called with component's container as detailed above in the discussion of FIG. 5B. Then, control returns via label 544.

If an Edit Implementation command is detected at label 560 of FIG. 5A, then processing carries out an action implementation changed as set forth in function block 570 and detailed above in the discussion of FIG. 5C.

If a Delete Component command is detected at 530 of FIG. 5A, then the container changed processing for component A is initiated as shown in function block 540 and detailed in the discussion of FIG. 5D. Then, container A is deleted, and control is returned via label 550.

If a Move Component command is detected at 580 of FIG. 5A, then the container changed processing for component A is initiated as shown in function block 590 and detailed in FIG. 5D. Then, the component's container is set equal to new container, and the interface changed processing for component A is initiated as detailed in FIG. 5B. Finally, processing is returned via label 595.

Method for Determining Components of a Build

During a program build, the Project component maintains private lists of references called CompileLists. There is an InterfaceCompileList and an ImplementationCompileList. The Project also maintains a private list of references called the InternalErrorList. In practice, each of these lists may be physically represented by more than one list for reasons of efficiency.

Figure 6:
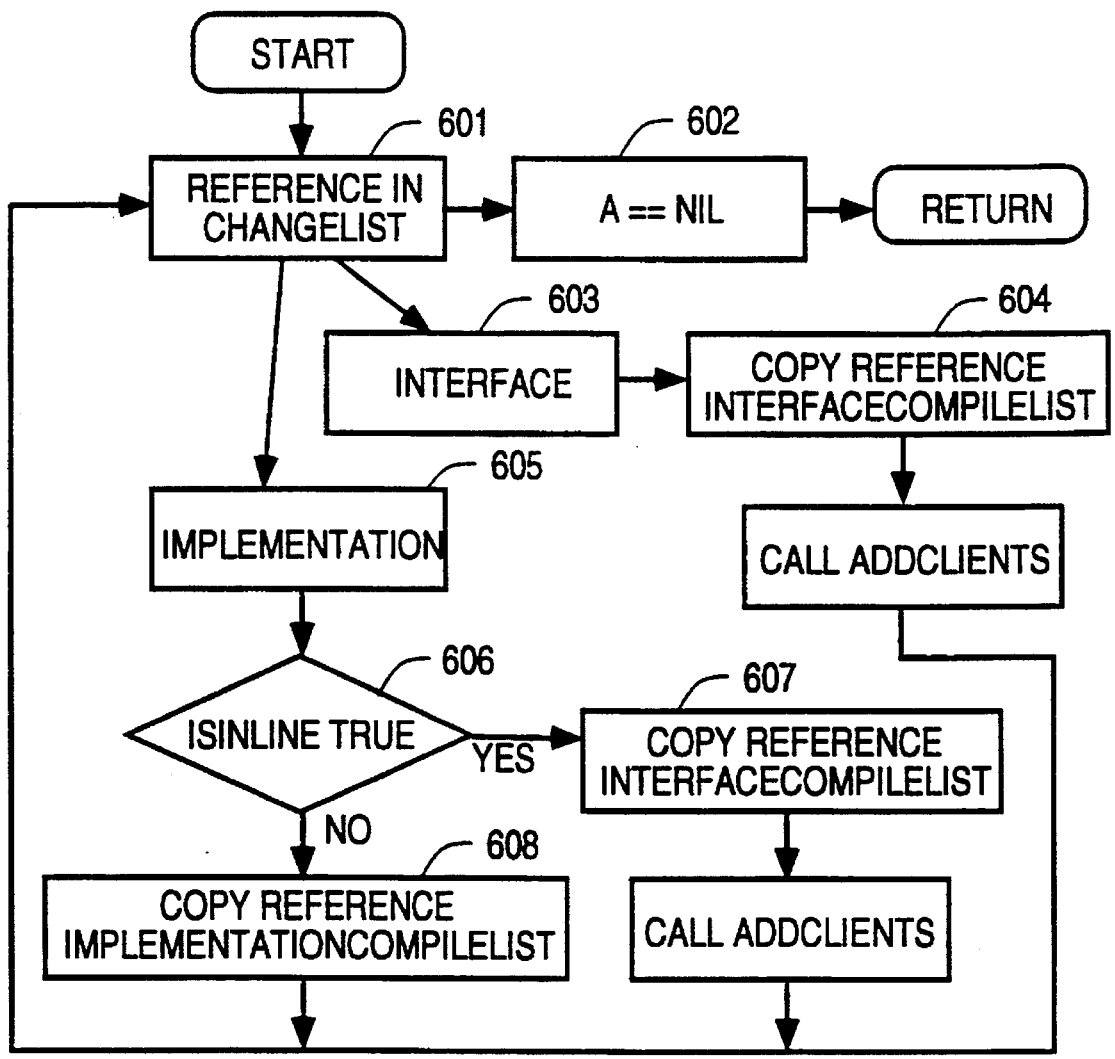
FIG. 6 is a flowchart showing the logic of determining the possible components in the first stage of the operation of the build mechanism according to the invention.

The process is shown in FIG. 6. For each reference in the Project's ChangeList, as indicated by function block 601, a reference is chosen from the front of the list. If there are no more references on the list, processing is complete as indicated at block 602. If the reference is an Interface, as determined at block 603, a copy of the reference is placed in the InterfaceCompileList in and the function AddClients is called to the reference in function block 604 before processing continues at block 601. If its property name is not Interface, then its property name is Implementation, as indicated at block 605, and a test is made in decision block 606 to determine if its IsInline attribute is True. If so, a copy of the reference is placed in the InterfaceCompileList and the function AddClients is called on the reference in function block 607 before processing continues at block 601. Otherwise, its property name must be Implementation and its IsInline attribute must be False, and a copy of the reference is placed on the Implementation CompileList in function block 608 before processing continues at block 601.

The pseudocode for the function CreateCompileLists is as follows:

```
CreateCompileLists( ){
  for each A in ChangeList{
    if ( A.PropertyName == Interface ){
      InterfaceCompileList.Add( A );
      AddClients( A );
    }
    else if( A.PropertyName == Implementation ){
      if( IsInLine == True ){
        InterfaceCompileList.Add( A );
        AddClients( A );
      }
      else if( IsInLine == False ){
        ImplementationCompileList.Add( A );
      }
    }
  }
}
```

The function AddClients, for each reference in the parameter references clients properly, examines the reference and, if its BuildState is Compiled, sets the reference's BuildState to Uncertain, adds a copy of the reference to the appropriate CompileList, and calls AddClients on the reference. This process is called creating the Client Closure of the ChangeList. The Client Closure represents the subset of components that may need to be recompiled as the result of a build. In practice, dependencies and changes generated by the compiler as the build progresses are used to avoid having to compile as many components as possible in the Client Closure.

The following is the pseudo-code for the AddClients function:

```
AddClients( A ){
  for each B in A.ClientList{
    if( B.BuildState == Compiled ){
      B.SetBuildState( Uncertain );
      if( B.PropertyName == Interface ){
        InterfaceCompileList.Add( B );
        AddClients( B );
      }
      else if( B.PropertyName == Implementation ){
        ImplementationCompileList.Add( B );
        AddClients( B );
      }
    }
  }
}
```

Method for Processing Interfaces

Figure 7:
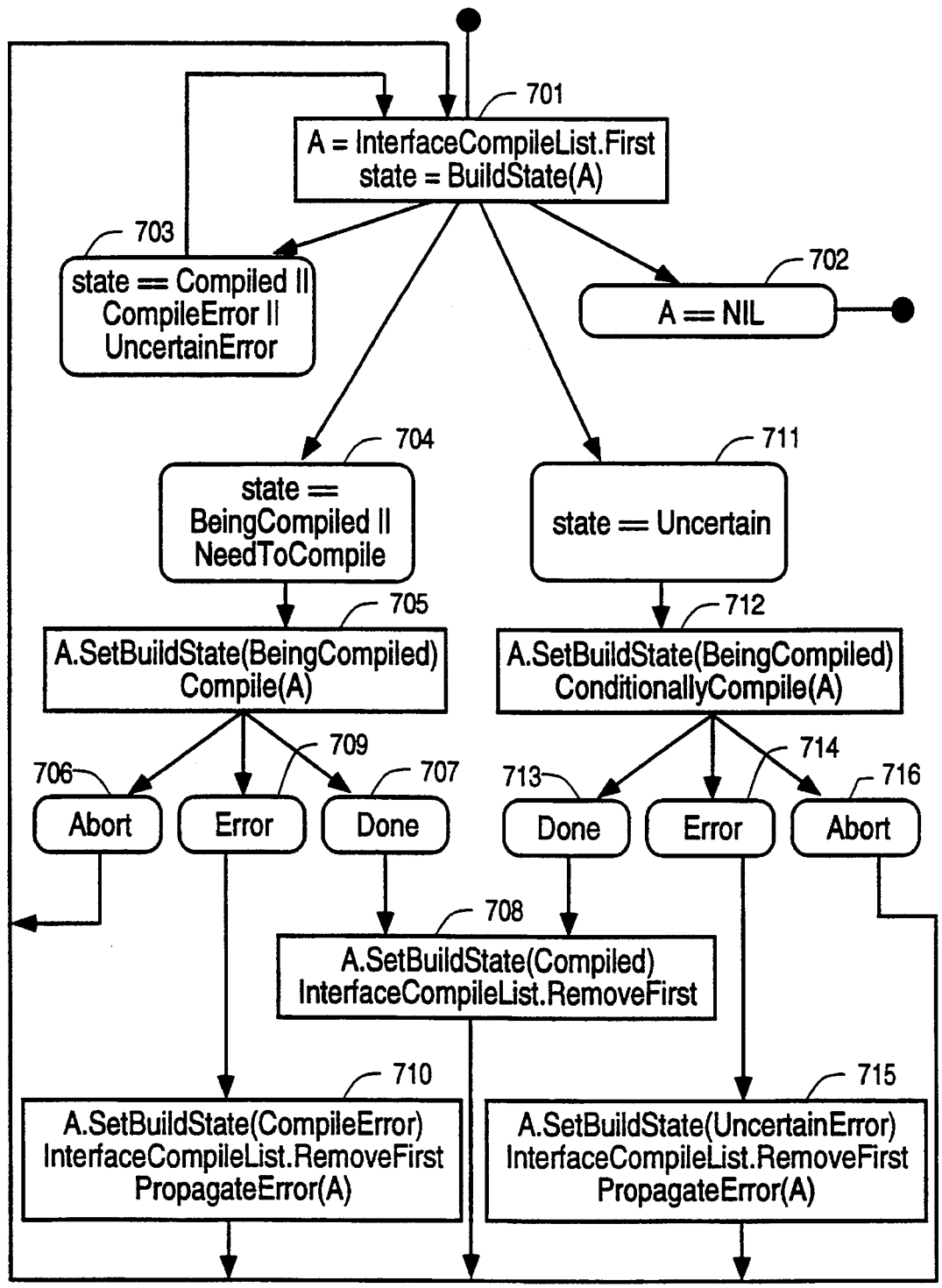
FIG. 7 is a flowchart showing the logic of processing Interfaces in the second stage of the operation of the build mechanism according to the invention.

This is the second stage of the Build process. The possible BuildStates for items on the InterfaceCompileList are Compiled, BeingCompiled, NeedToCompile, Uncertain, CompileError or UncertainError. The Interface CompileList is processed until it is empty as shown in the flowchart of FIG. 7. The process is entered at block 701 where a reference is chosen from the front of the InterfaceCompileList. If there are no more references on the list, processing is complete at block 702. If the interface BuildState of the component associated with the reference is Compiled, CompileError or UncertainError, as indicated in block 703, the reference is removed from the front of the list and processing continues in block 701. If the Interface BuildState of the component associated with the reference is BeingCompiled or NeedToCompile, as indicated in block 704, the BuildState of the component is set to BeingCompiled in function block 705.

Then, the Compile function (which invokes the compiler 42) is called on the Interface of the component. This function will return one of the values Abort, Done and Error. If the value returned is Abort at block 706, then processing continues at block 701. If the value returned is Done at block 707, then the Interface BuildState of the component is set to Compiled and the reference is removed from the front of the list at block 708 before processing continues with block 701. If the value returned is Error at block 709, then the Interface BuildState of the component is set to CompileError, the reference is removed from the front of the list, and the function PropagateError is called on the component in function block 710 before processing continues at block 701. If the Interface BuildState of the component associated with the reference is Uncertain, as determined at block 711, the BuildState of the component is set to BeingCompiled at function block 712.

Then, the ConditionallyCompile function (which may or may not call the compiler 42) is called on the Interface of the component. This function will also return one of the values Abort, Done and Error. If the value returned is Abort, then processing continues at step 1. If the value returned is Done at block 713, then the reference is removed from the front of the list at function block 708, and processing continues at block 701. If the value returned is Error at block 714, then the reference is removed from the front of the list and the function PropagateError is called on the component in function block 715 before processing continues at block 701.

The pseudocode for the ProcessInterfaces function is as follows:

```
ProcessInterfaces( ){
  until(( A = InterfaceCompileList.First ) == NIL ){
    state = A.BuildState;
    if( A = Compiled _ CompileError _ Uncertainerror ){
      InterfaceCompileList.RemoveFirst( );
    }
    else if( state = BeingCompiled _ NeedToCompile ){
      A.SetBuildState( BeingCompiled );
      value = Compile( A );
      if( value == Abort ){
        continue;
      }
      else if( value == Done ){
        A.SetBuildState( Compiled );
        InterfaceCompileList.RemoveFirst( );
      }
      else if( value == Error ){
        A.SetBuildState( CompileError );
        InterfaceCompileList.RemoveFirst( );
        PropagateError( A );
      }
    }
    else if( state = Uncertain ){
      A.SetBuildState (BeingCompiled );
```

```
value = ConditionallyCompile( A );
if( value == Abort ){
  continue;
}
else if( value == Done ){
  A.SetBuildState( Compiled );
  InterfaceCompileList.RemoveFirst( );
}
else if( value == Error ){
  A.SetBuildState( UncertainError );
  InterfaceCompileList.RemoveFirst( );
  PropagateError( A );
 }
 }
 }
}
```

The function PropagateError adds a reference corresponding to the component to the Project's InternalErrorList and carries out the following for every reference on the component's Client list: If the reference's BuildState is CompileError or UncertainError, the process continues with the next reference. If the reference's BuildState is NeedToCompile, the process sets its BuildState to CompileError, adds the reference to the InternalErrorList, and calls PropagateError on the reference before continuing with the next reference. If the reference's BuildState is Uncertain, the process sets its BuildState to UncertainError, adds the reference to the InternalErrorList, and calls PropagateError on the reference before continuing with the next reference.

The pseudocode of the function PropagateError is as follows:

```
PropagateError ( A ){
  for each B in A.ClientList {
    state = B.BuildState;
    if( state == CompileError _ UncertainError )[
      continue;
    }
    else if( state == NeedToCompile ){
      B.SetBuildState( CompileError ){
      InternalErrorList.Add( B );
      PropagateError( B );
    }
    else if( state == Uncertain){
      B.SetBuildState( UncertainError );
      Internal ErrorList.Add( B );
      PropagateError( B );
    }
  }
}
```

Method For Processing Implementations

Figure 8:
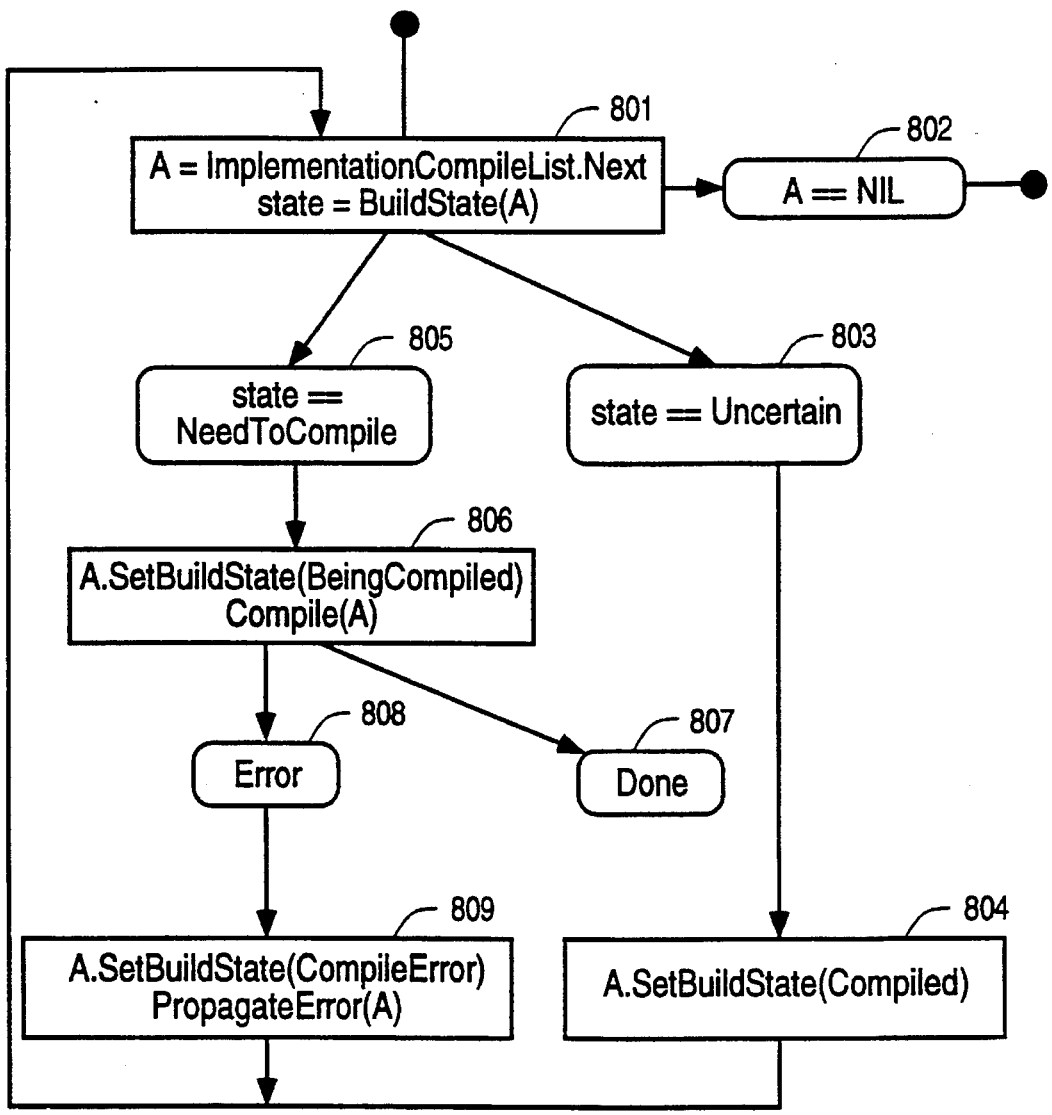
FIG. 8 is a flowchart showing the logic of processing Implementations in the third stage of the operation of the build mechanism according to the invention.

This is the third stage of the Build process. Each reference in the ImplementationCompileList is processed as shown in the flowchart of FIG. 8. The process is entered at block 801 where a reference is chosen from the front of the ImplementationCompileList. If there are no more references on the list, processing is complete at block 802. If the BuildState of the reference is Uncertain, as determined in block 803, the BuildState is set to Compiled in function block 804 before processing continues in block 801. If the BuildState of the reference is NeedToCompile, as determined in block 805, the component is compiled in function block 806. The possible values returned from the compiler 42 are Done and Error. If the value returned is Done at block 807, the BuildState of the reference is set to Compiled in function block 804 before processing continues in block 801. If the value returned is Error in block 808, the BuildState of the reference is set to CompileError and the function PropagateError is called on the component in function block 809 before processing continues in block 801. If the BuildState of the reference is CompileError or UncertainError, nothing is done. Note that the processing of Implementations is order independent at this stage because dependencies can only be on Interfaces or Implementations whose IsInline attribute is True, and these have already been processed.

The pseudocode for ProcessImplementations is as follows:

```
ProcessImplementations( ){
  for each A in ImplementationCompileList{
    state = A.BuildState;
    if( state = Uncertain ){
      A.SetBuildState( Compiled );
    }
    else if( state = NeedToCompile ){
      value = Compile( A );
      if( value == Done ){
        A.SetBuildState( Compiled );
      }
      else if( value == Error ){
        A.SetBuildState( CompileError );
        PropagateError( A );
      }
    }
    else if(state = CompileError _ UncertainError ){
    }
  }
}
```

Compiler Which Supports Build Process

The compiler 42 is called via the Compile function, and these two may be used as synonyms. The compiler 42 processes the source text and identifies the names of possible external components. The compiler 42 next obtains a list of references to all components The compiler may eliminate references from the list using language specific knowledge such as component kinds. The compiler then calls the function called GetDeclaration for each external component identified in the text. The Compile function clears any existing errors on a component before invoking the compiler 42. This will clear any error messages from the Errors property and remove any references from the Project's ErrorList property.

Figure 9:
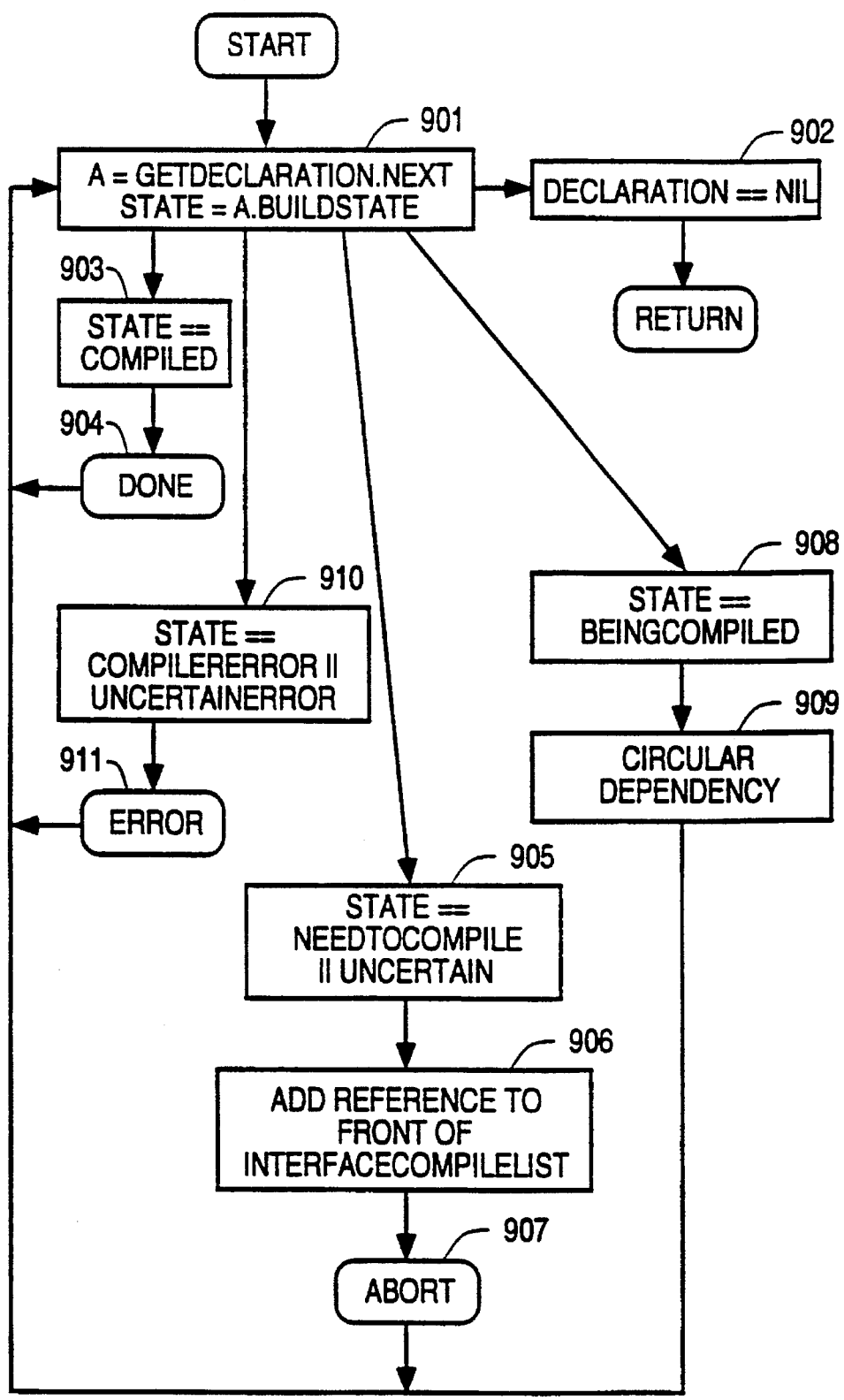
FIG. 9 is a flowchart showing the logic of the GetDeclarations function called by the compiler according to the invention.

The compiler first calls the GetDeclaration function, which is illustrated by the flowchart of FIG. 9. The GetDeclaration function returns one of the values Abort, Done, Circulardependency or Error and may additionally return the data of the Declaration. The process is entered at block 901 where each reference is examined for its BuildState. If there are no more references to process, as indicated by block 902, processing is complete and a return is made. If the BuildState of the component is Compiled, as indicated at block 903, the function returns Done at function block 904, and the stored Declaration data is also returned, before processing continues at block 901. If the BuildState of the component is NeedToCompile or Uncertain, as indicated at block 905, a reference corresponding to the component is added to the front of the InterfaceCompileList in function block 906 and the function returns Abort in function block 907 before processing continues at block 901. Declaration data is not returned in this case. If the BuildState of the component is BeingCompiled, as indicated by block 908, then the function returns Circulardependency at function block 909 before processing continues at block 901. Declaration data is not returned for this case either. If the BuildState of the component is CompileError or UncertainError, as indicated in block 910, then the function returns Error in function block 911 before processing continues at block 901. Again, declaration data is not returned.

The pseudocode for the GetDeclaration function is as follows:

```
value GetDeclaration( A, Declaration ){
  Declaration = NIL;
  state = A.BuildState;
  if( state == Compiled ){
    Declaration = CurrentDeclaration( );
    return( Done );
  }
  else if( state == NeedToCompile _ Uncertain ){
    InterfaceCompileList.AddToFront( A );
    return( Abort );
  }
  else if( state == BeingCompiled ){
    return( Circulardependency );
  }
  else if( state == CompileError _ UncertainError ){
    return( Error );
  }
}
```

After calling GetDeclaration, the compiler continues as follows. If the value returned was Abort, the compiler must terminate processing and return the value Abort. An alternative implementation would be for the compiler to suspend compilation, to be restarted or abandoned after compiling the returned component. This would require the compiler to be reentrant but otherwise requires no essential change to the procedure as described. If the value returned was Compiled, the compiler can continue processing. If the Declaration is used, this will constitute a SourceReference dependency, and the compiler should keep track of both the dependency and its nature. If the value returned was Circulardependency or Error, then the compiler must terminate processing, call the SetError function on the component, and return the value Error. The compiler may optionally continue processing to possibly find more errors before terminating.

If the calls to GetDeclaration return Compiled, the compiler will continue processing the source text in a conventional manner. If any error is encountered in the processing, the compiler will call the SetError function on the component and return the value Error. If no errors are encountered, the compiler then returns the value Done. If the compiler has been processing an interface, then it will store the new value of the Declaration property.

Method for Processing Errors

Before the compiler is called to compile an Interface or Implementation, any existing Errors are cleared. This will ensure that all error messages are up to date. Because of the built-in dependency between Interfaces and Implementations and the fact that the errors are propagated, it is never possible to get compiler errors on both the Interface and the Implementation on the same build.

When the compiler encounters an error, it calls the function SetError which communicates information about the error, including the location of the error and a message describing the error, back to the erroneous component. This information is stored in the Errors property and the appropriate source property (Interface or Implementation) of the component. Also a reference is stored in a global error list maintained by the Project which allows convenient access to all errors.

The error will be propagated to any dependent component so that these components need not be compiled later, since it is known that these compiles will fail. Furthermore, the build will continue after errors are encountered and will correctly build as many components as possible that are not themselves explicitly in error or which depend on components with errors.

The SetError function takes the error message passed to it by the compiler 42 and creates an entry in the component's Errors property corresponding to the appropriate property (Interface or Implementation). It also creates an entry in the Project's ErrorList property corresponding to the error. The two entries created in this way share the same key so that they remain "linked". The function also typically records the position of the error in the program source using a "sticky marker" which remains attached to the same range of characters during later user editing.

If the compiler successfully completes processing of the source text, it will produce object code and store the resultant object code in the object code property. The act of storing the object also causes it to be incrementally linked as described hereinafter.

The compiler will now update the SourceReferences property of the component and the Clients properties of each SourceReference. For each reference to, say, component B in the SourceReferences property of, say, component A, there will need to be a corresponding reference (which has the same dependency information) to component A in the Clients property of component B.

The compiler will create a change describing the ways in which the Declaration has changed from its previous value. The compiler will call the function PropagateChange on the component passing it the calculated change. The compiler will then set the new value of the Declaration. The function PropagateChange matches the change against the dependency of each reference in the component's Client List. If the match indicates that the referenced component has been affected by the change and its BuildState is not CompileError or UncertainError, its BuildState is set to NeedToCompile.

It is possible for the compiler to use the SetError function to issue warning messages or suggestions of various forms. In this case, if only warning messages are returned, the Compile function should return Done. The warning messages will be added to the Errors property and references will be added to the Project's ErrorList property. However, otherwise the compile is treated as successful. The appropriate BuildState will be set to Compiled and no errors will be propagated. If only warnings or suggestions are issued, then the program will be completely and correctly built.

Process for Conditionally Compiling a Component

Figure 10A:
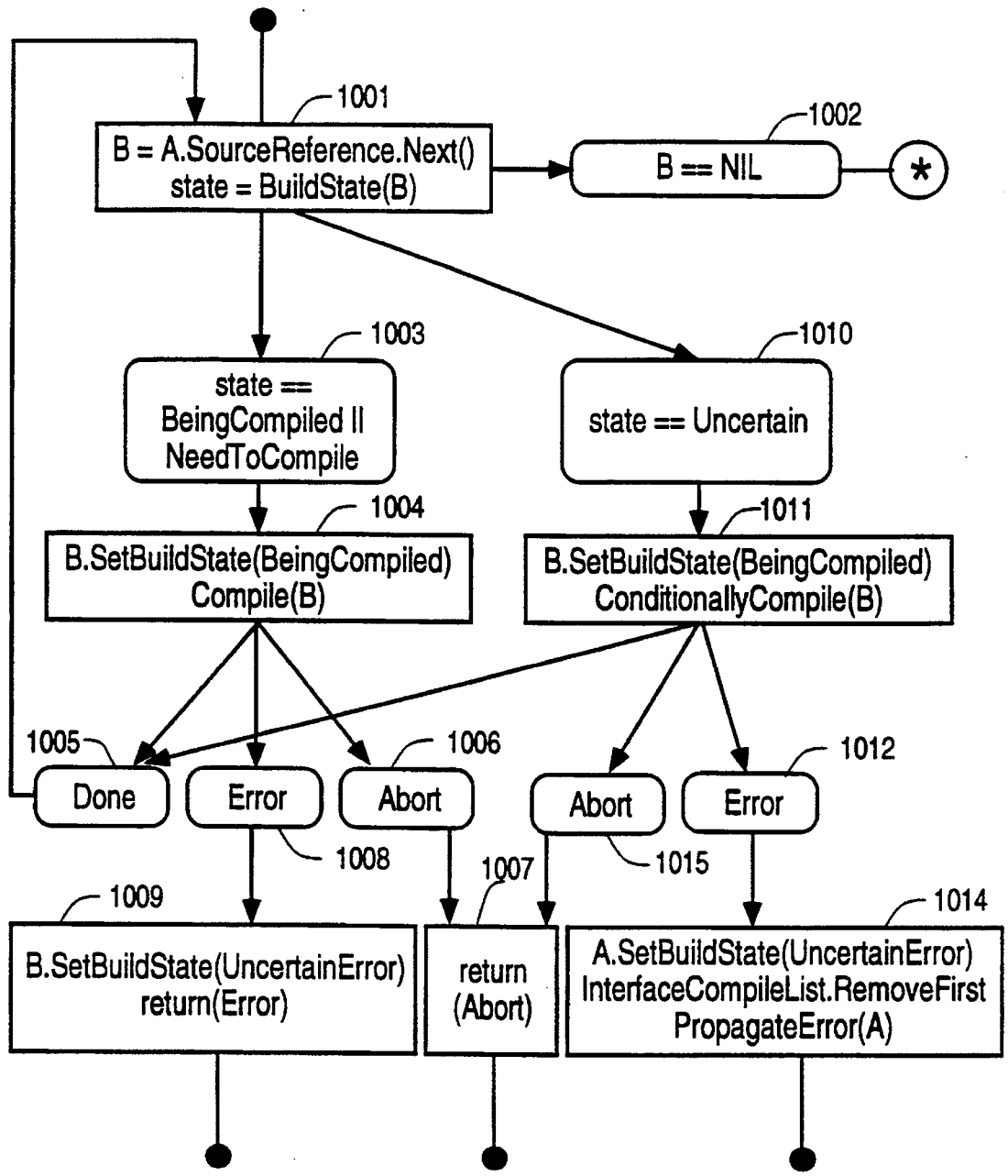
FIGS. 10A and 10B, taken together, are a flowchart showing the logic of the Conditionally Compile function.
Figure 10B:
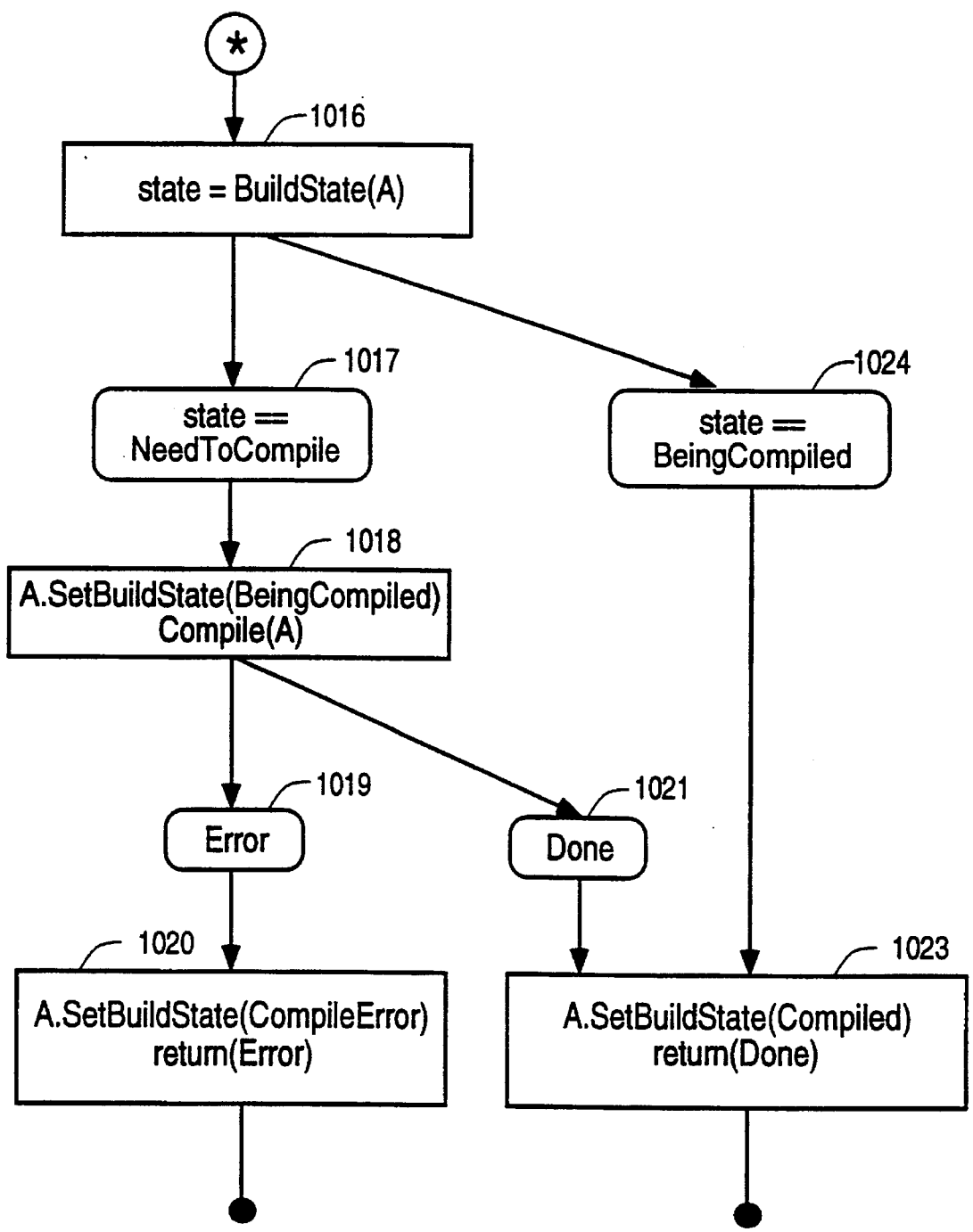

The flowchart for the function ConditionallyCompile is shown in FIGS. 10A and 10B, to which reference is now made. Each component B in a component A's SourceReferences is processed in block 1001. If all components B have been processed, as indicated by block 1002, then processing is complete as to the components B, and the process goes to FIG. 10B to compile component A. If the BuildState of component B is BeingCompiled or NeedToCompile, as indicated at block 1003, the BuildState of the component is set to BeingCompiled and the component is compiled in function block 1004. The Compile function may return one of the values Done, Abort or Error. If the value Done is returned in block 1005, processing continues in block 1001.

If the value returned is Abort in block 1006, the function is terminated and the Abort is returned in function block 1007. If the value returned is Error in block 1008, the original component's BuildState is set to UncertainError, the function is terminated, and Error is returned in function block 1009. If the BuildState of component B is Uncertain, as indicated at block 1010, then the BuildState is set to BeingCompiled and the component is conditionally compiled in function block 1011. Again, the ConditionallyCompile function may return one of the values Done, Abort or Error. If the value Done is returned in block 1005, processing continues in block 1001. If Error is returned in block 1012, the component's BuildState is set to UncertainError, the component A is removed from the InterfaceCompileList, and the PropagateError function is called in function block 1014 before the function is terminated. If Abort is returned in block 1015, Abort is returned in function block 1007 before the function is terminated.

Turning now to FIG. 10B, if all the reference's have been processed, then they all have the BuildStates Compiled. However, one of the SourceReferences may have propagated a change to the component during the processing to this point, and so its BuildState may now be either BeingCompiled or NeedToCompile. Therefore, the BuildState of component A is determined in block 1016. If the BuildState is NeedToCompile, as indicated at block 1017, then the BuildState is set to BeingCompiled and component A is compiled in function block 1018. The compiler can return either Error or Done. Note that Abort should never occur because all the SourceReferences are Compiled at this stage. If Error is returned in block 1019, then the BuildState is set to CompileError and Error is returned in function block 1020. If Done is returned in block 1021, then the BuildState is set to Compiled and Done is returned in function block 1023. If the BuildState of component A is BeingCompiled, as indicated at block 1024, then the BuildState is set to Compiled and Done is returned in function block 1023.

The pseudocode for the function ConditionallyCompile is as follows:

```
value ConditionallyCompile( A ){
  for each B in A.SourceReference{
    state = B.BuildState;
    if( state == NeedToCompile _ BeingCompiled ){
      B.SetBuildState( BeingCompiled );
      value = Compile( B );
      if( value == Done ){
        continue;
      }
      else if( value == Abort ){
        return( Abort );
      }
      else if(value == Error ){
        A.SetBuildState( UncertainError );
        return( Error );
      }
    }
    else if( state == Uncertain );
      A.SetBuildState( BeingCompiled );
      value = ConditinallyCompile( A );
      if( value == Done ){
        continue;
      }
      else if( value == Abort ){
        return( Abort );
      }
      else if( value == Error ){
        A.SetBuildState( UncertainError );
        InterfaceCompileList.Remove( A );
        PropagateError( A );
      }
  }
  }
  state = A.BuildState;
  if( state == NeedToCompile ){
    A.SetBuildState( Being Compiled );
    value = Compile( A );
    if( value == Done ){
      A.SetBuildState( Compiled );
      return( Done );
    }
    else if( value == Error ){
      A.SetBuildState( CompileError );
      return( Error );
    }
  }
  A.SetBuildState( Compiled );
  return( Done );
}
```

Method for Post Processing Errors

The method for post processing errors is the fourth stage of the Build process. If any errors occurred during the build, then the function PostProcessErrors is called at the end of the build. For each reference in the InternalErrorList, if the reference's BuildState is CompileError, the BuildState is changed to NeedToCompile. If the reference's BuildState is UncertainError, the BuildState is changed to Compiled.

When all the references on the InternalErrorList have been processed, the list is cleared of all entries. As a convenience to the programmer, if the Project's ErrorList contains any entries, a window or the Browser is opened on the Project's ErrorList.

The pseudocode for the PostProcessErrors function is as follows:

```
PostProcessErrors( ){
  for each A in InternalErrorList{
    state = A.BuildState;
    if( state == CompileError ){
      A.SetBuildState( NeedToCompile );
    }
    else if( state == UncertainError ){
      A.SetBuildState( Compiled );
    }
  }
  InternalErrorList.ClearAll( );
  if( ErrorList.Count !=0 ){
    OpenErrorWindow( );
  }
}
```

Using HOOPS

Figure 11:
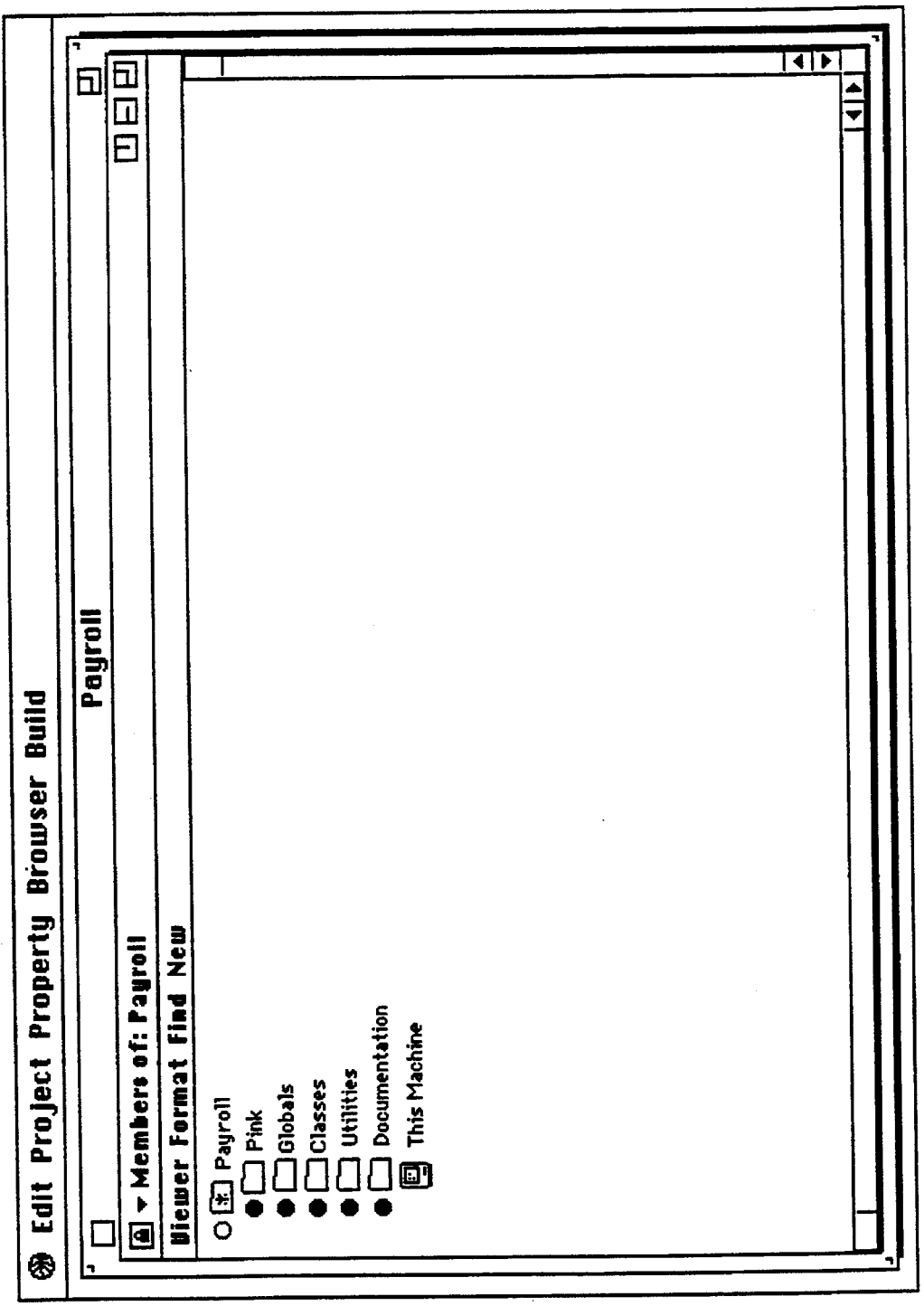
FIG. 11 is a pictorial representation of a computer screen showing a typical members viewer when the using the invention.

The Human Oriented Object Programming System (HOOPS) according to the invention can be started on the computer by entering either a project name or an existing project name, depending on whether a new program is to be built or an existing program is to be edited. When HOOPS is started, a window is opened and an initial screen similar to the one shown in FIG. 11 is displayed. The initial window that HOOPS opens displays the Members property of the Project component and its immediate members. Although it initially only displays the immediate members, the same window is used to display every component starting at the project component. In the example shown in FIG. 11, a Project called "Payroll" has been imported.

Viewers

A viewer is a graphical presentation intended to display a particular property of a component. However, in the process of displaying that property, it may be required for the viewer to display ancillary information, including data from other properties. A viewer has an input and output. The input designates at least a component and a property. It may also designate a subrange of the property's information. The output minimally designates a component. It may also designate a property, and a subrange of the property's data. The output may change over time in response to user actions and state changes within the system.

A viewer list is a named list of viewer specifications, where each specification defines a viewer name and implementation class. There is a distinguished viewer list called the empty viewer list, which contains no viewer specifications. A viewer list name is associated with each property. The property may be displayed by any of the viewers specified in the list. If a property is associated with the empty viewer list, then there are no viewers for the property, and the property is considered non-displayable. A preferred viewer is associated with each property. The preferred viewer must be among the viewers specified in the viewer list associated with the property. A preferred property is associated with each component for viewing purposes.

Panes

A viewer is displayed within a pane. A pane has an input and an output. The input designates a component at a minimum. It may also designate a property of the component and a subrange of the property's data. The output designates a component at a minimum, and optionally a property and a subrange of the property's data. The output may change over time in response to user actions and state changes within the system.

A pane determines its viewer's input, generally by deriving it from the pane input. The derivation may vary from pane to pane, either dynamically based on system state or statically by varying the implementations of panes. In the simplest derivation, a viewer's input is identical to the input of the pane. Similarly, a pane's output is derived from the output of the viewer's pane. The nature of this derivation varies from pane to pane, either dynamically based on system state, or statically by varying the implementations of panes. In the simplest derivation, a pane's output is identical to the output of it's viewer.

Windows

Panes are displayed in a window. A window is subdivided into one or more panes. The layout and number of panes in a window can be dynamically controlled by the user. A preferred embodiment provides pane splitter controls in each pane to facilitate creation and management of multiple panes. The controls are used to divide a single pane into one or more panes.

Figure 12:
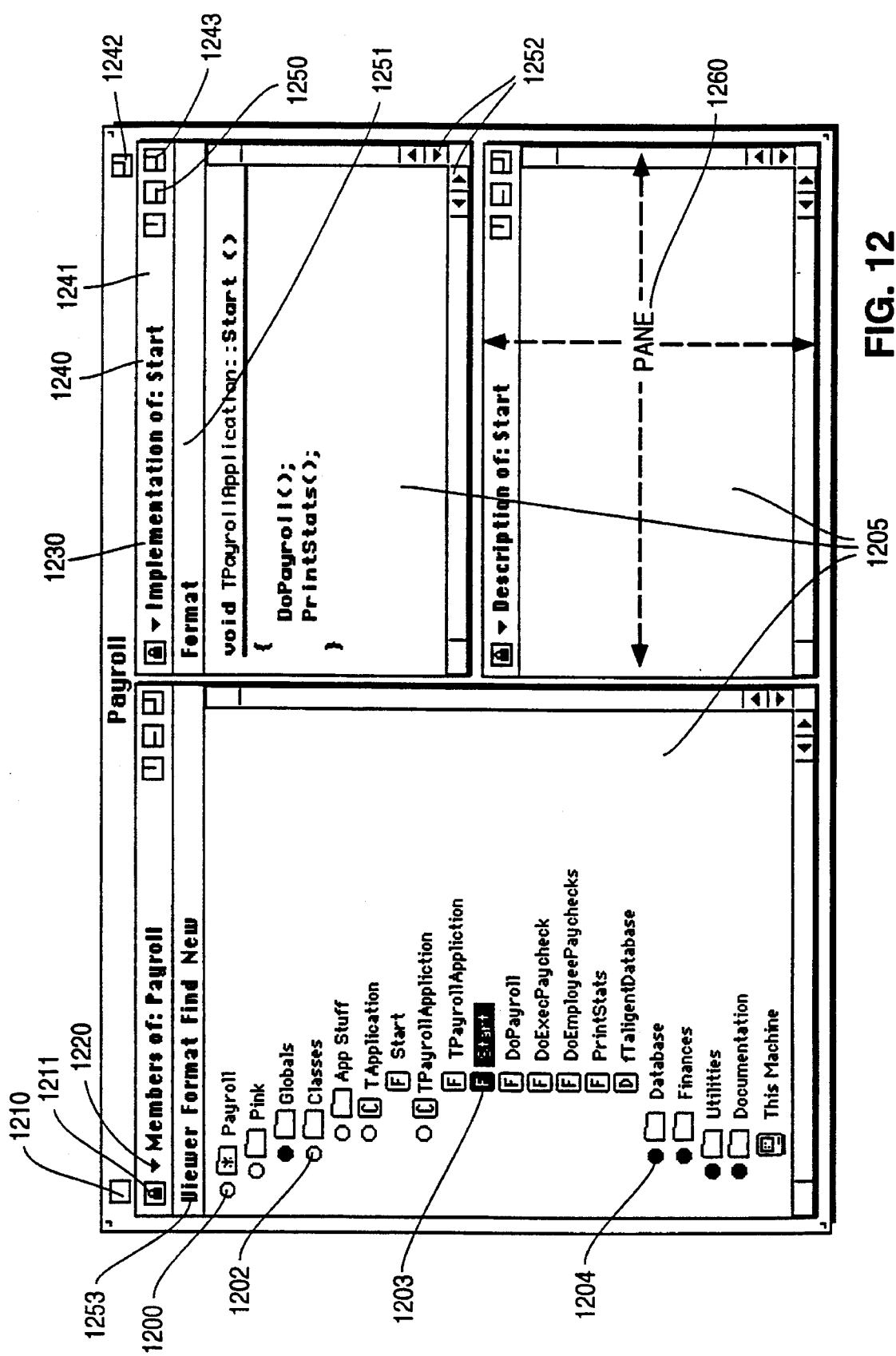
FIG. 12 is a pictorial representation of a computer screen showing a browser according to the invention.

FIG. 12 illustrates a browser in accordance with the subject invention. Every window in HOOPS is a browser. Browsers are temporary viewing and editing tools for looking at information in the Project. They can be deleted at any time by clicking on the dose icon 1210 in the window. Any changes made to the Project while in the browser are automatically saved. A browser has a project root component 1200 that is specified when it is opened. An example of a container component is presented at 1202, a selected component is shown at 1203, a pane property lock 1211, a pane property popup menu control 1220 and an expand or collapse control is shown at 1204. This control permits a user to anchor a pane to a particular property. A property 2130 of the input component is displayed in a pane 1260, and each pane 1260 displays one property viewer 1205 or is blank, as shown at 1260. New panes are added to a browser by choosing one of the split icons 1250 in the upper right corner of a pane. The pane splitter control 1250 permit a user to split a pane into two panes and control the dimensions of a pane. There is also a pane and browser zoom box 1242 and 1243 which permits a user to dynamically zoom a pane to completely fill a window, and which permits a user to unzoom a zoomed pane back to its original dimensions. Horizontal and vertical scroll controls 1252 are also provided to permit the scrolling of contents of a viewer within a pane. A pane title bar 1241 displays the name of the component and property displayed by the pane. A viewer menu 1251 is also provided to permit a user to select the viewer used to display the selected property. The viewer menu contains an entry for each viewer designated in the viewer list associated with the selected property.

There are three factors which combine to determine the specific viewer displayed with a pane: a component, a property of the component and a viewer of the property. The component is derived for the pane's input. The property is also derived from the pane's input, or overridden by a user. If the pane input designates a specific property of the input component, then this property determines the set of eligible viewers as defined by the associated viewer list of the property. If the pane input does not designate a property, then the property to be displayed is the component's default property.

A user can override the selected property by selecting another input component property for viewing or anchoring a pane to a specific property. When anchored, the pane displays the anchored property irrespective of the input component. When a pane's component or property changes, a new viewer is displayed in the pane. This viewer is the property's default viewer; although, a user may subsequently change the viewer to any of the items listed in the viewer list associated with the displayed property.

Figure 13:
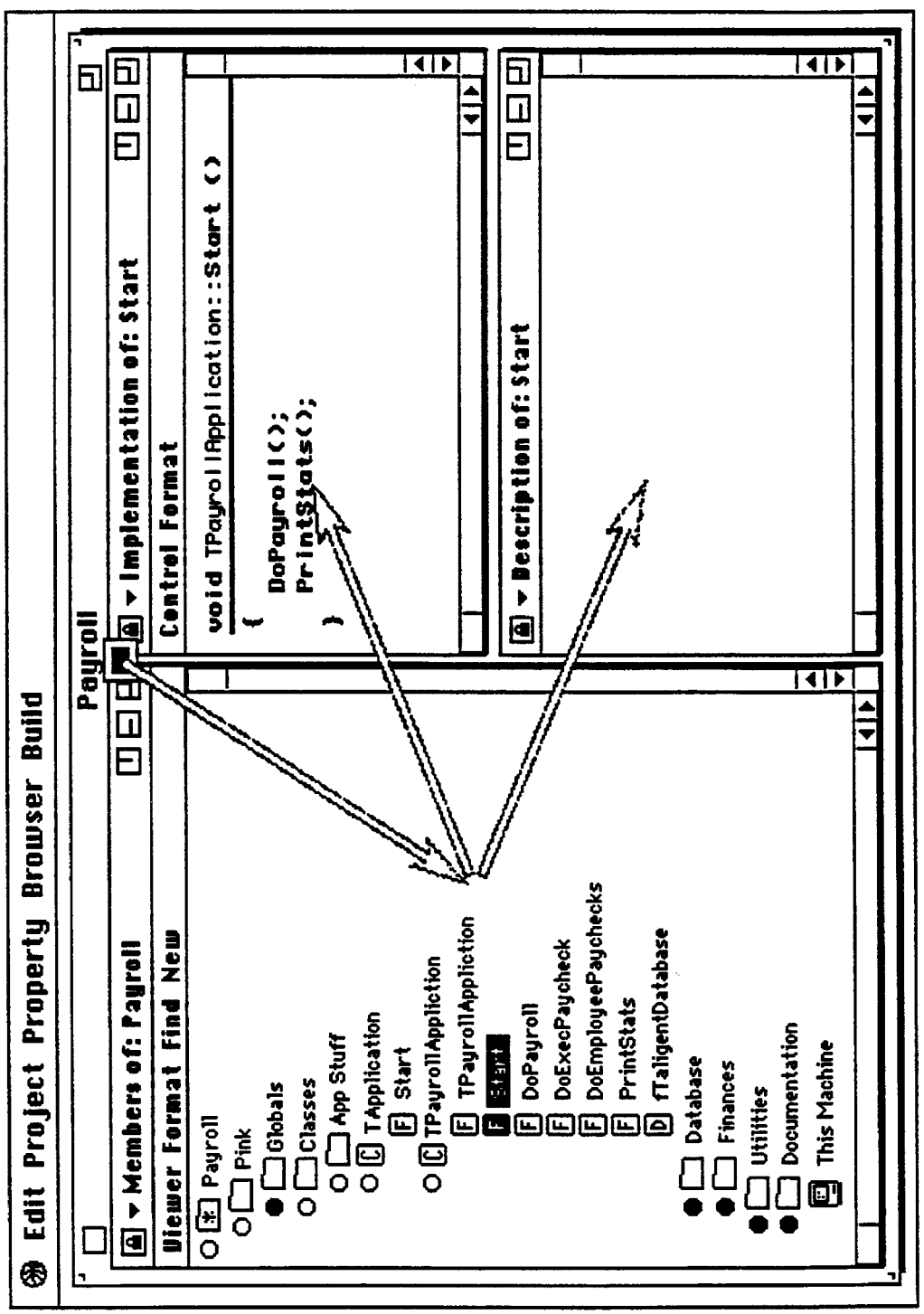

When a new pane is created, default wiring is created from the pane being split to the new pane. Wiring is the logical relationship between a pane. A pane can have zero or one wire input and zero or more wires as output, but wiring cannot form a loop. When a component is selected in a pane, the selection is converted into a reference to a component in the project and becomes a new input to the destination of any wires emanating from that pane. The wiring can be turned on by choosing Turn on Wiring from the Browser menu selected from the menu bar, resulting in the display of superimposed graphic wires as shown in FIG. 13. Using this display, it is possible to change the wiring between two panes by clicking down with the mouse on the new input location and dragging to the target pane.

A wire may transform its input before creating a wire output. There may be different implementations of wires used to establish connections, and each implementation may incorporate a different type of transformation. In the simplest implementation, the wire's input passes unchanged through the wire to its output. The output of a pane may be connected to any number of wires which provides a mechanism in which the output of a single pane "controls" the input of any number of other panes. A user can dynamically control the connections between the panes, and connections can be created across windows.

Figure 14:
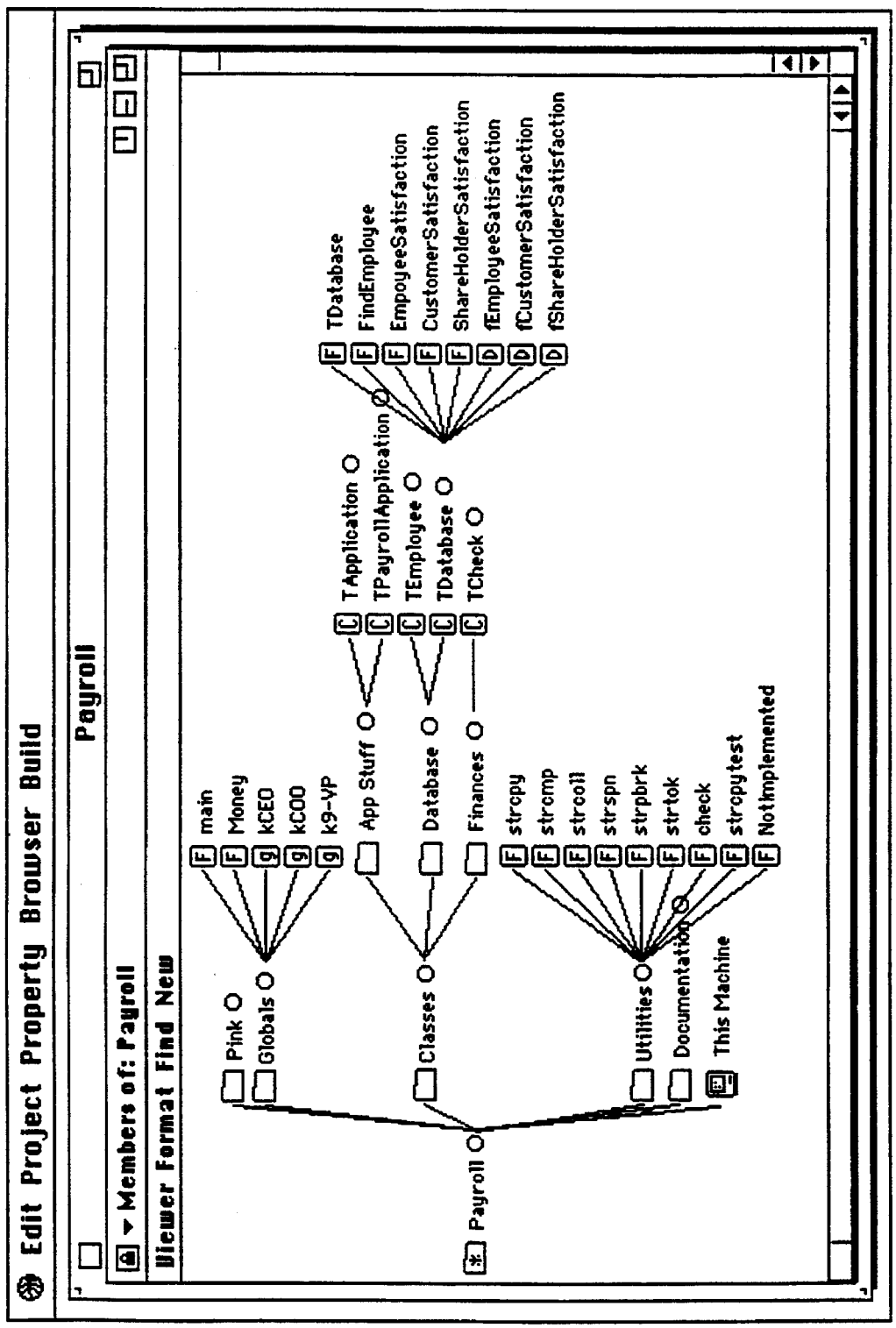
FIG. 14 is a pictorial representation of a computer screen showing a partially expanded project in a tree viewer.

In many viewers, such as Members, Clients and References, components can be distinguished by their names and their icons, which differ by component kind. In other viewers, a component's name simply appears in the text, such as in Source or Documentation. The component hierarchy can be browsed by expanding and collapsing container components in the Members property viewer, producing a Tree view, an example of which is shown in FIG. 14. One level of a component's subtree can be expanded or collapsed by clicking the component's circular toggle switch. When a component is selected in a viewer, either by clicking on its icon if it has one or by selecting its name in a text display, the Property menu in the global menu bar is adjusted to list the properties for that type of component. Any property of any component can be viewed by selecting the component in a viewer and then choosing a property from the Property menu. This opens a new browser containing a single viewer which displays the chosen property of the selected component.

Components are created from within either a Members or Interface viewer by specifying where the new component is to be created, and the kind of component it will be. The location of the new component is specified by either selecting an existing component or by placing an insertion point between components. The kind of component created is determined by which menu item is selected from the New viewer menu. All editing is automatically stored. Only changed components, and their clients affected by the change, are compiled. The recompiled components can be viewed by choosing the Show Components Built menu item from the Build menu. To see the components changed since the last build, the Show Components Changed from the Build menu is chosen. A program is compiled, and linked, by choosing Build from the Build menu. The Build & Run menu also runs the program.

Figure 15:
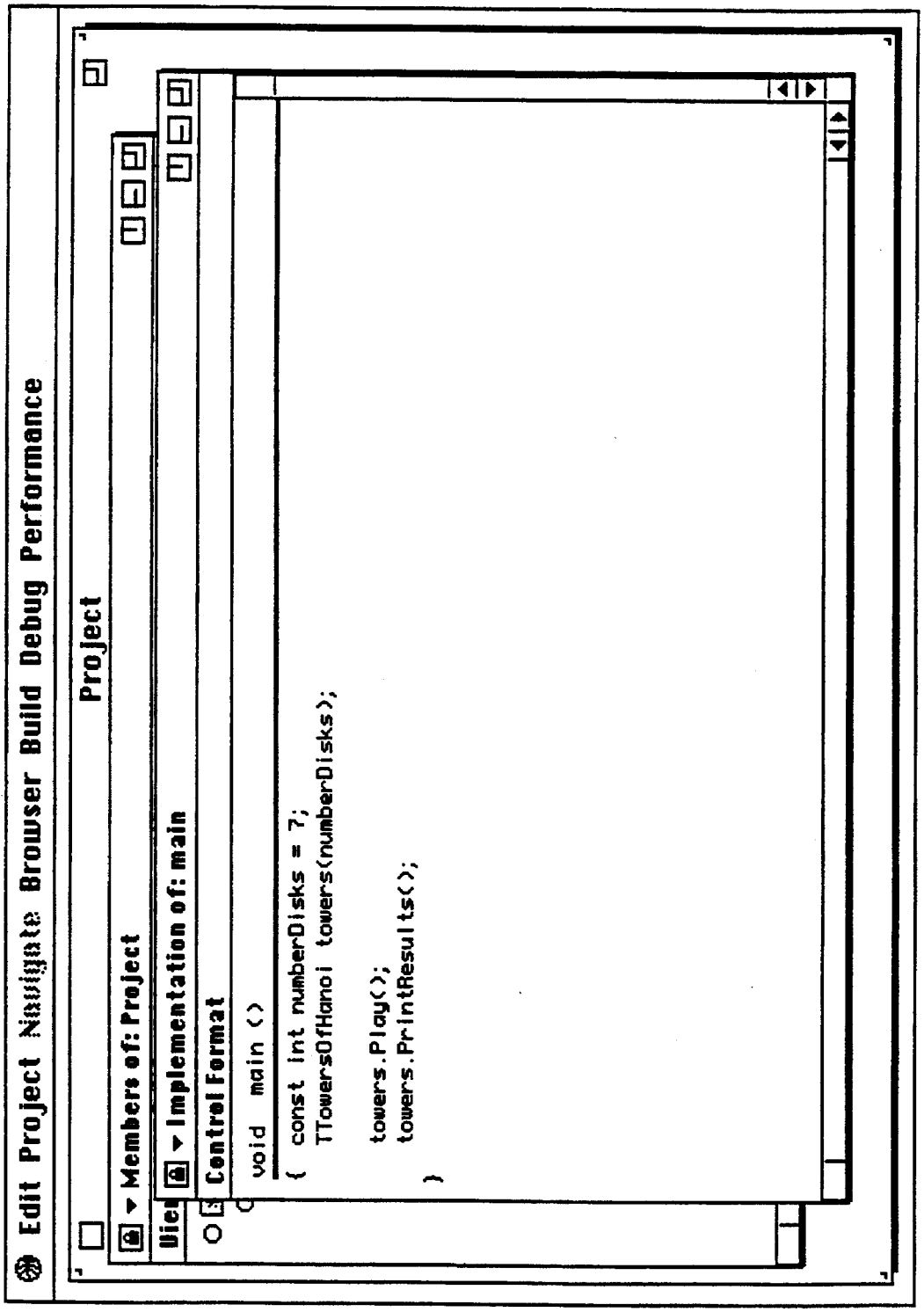
FIGS. 15 to 18 illustrate some of the screens displayed in the process of editing a component.
Figure 16:
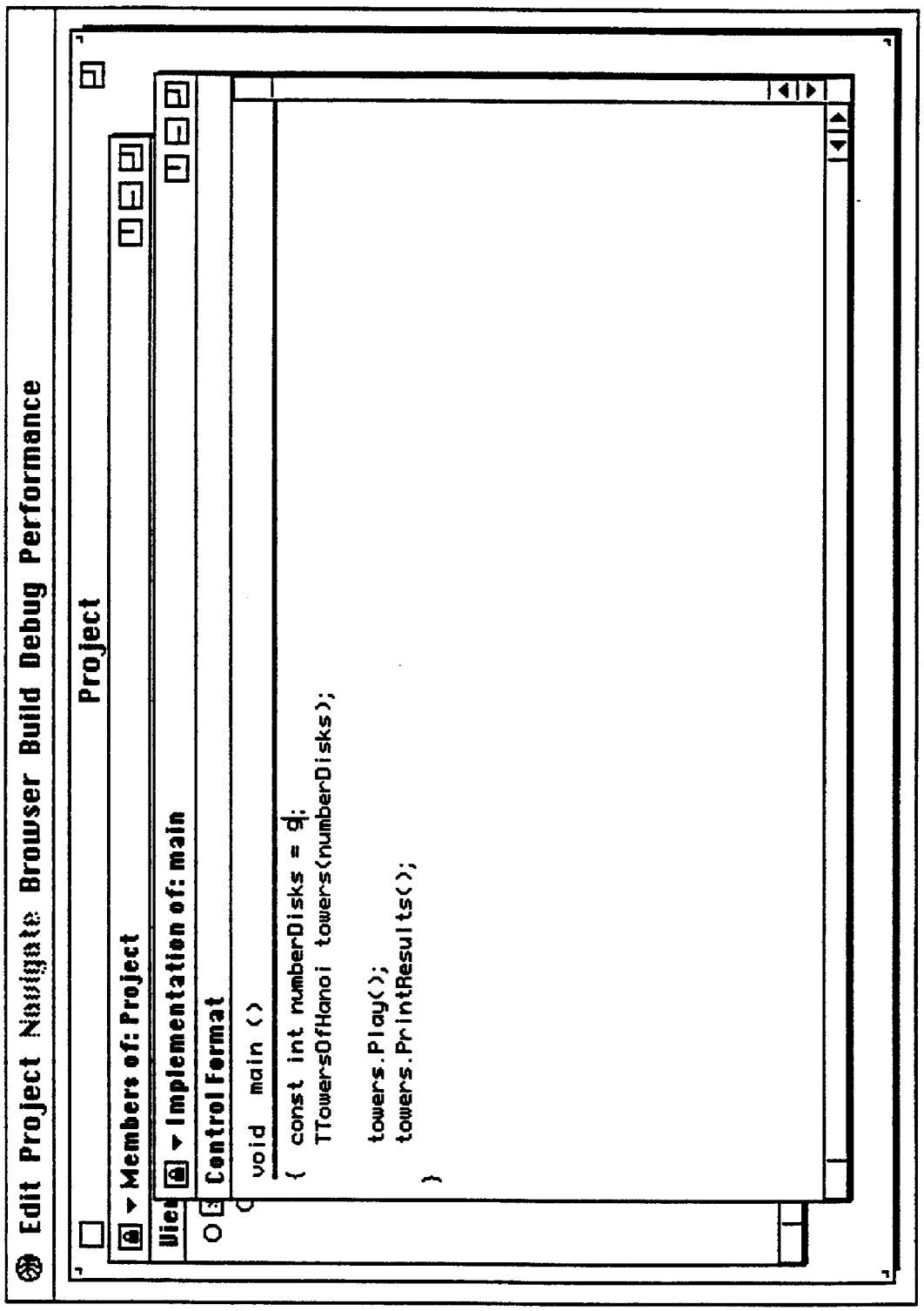
Figure 17:
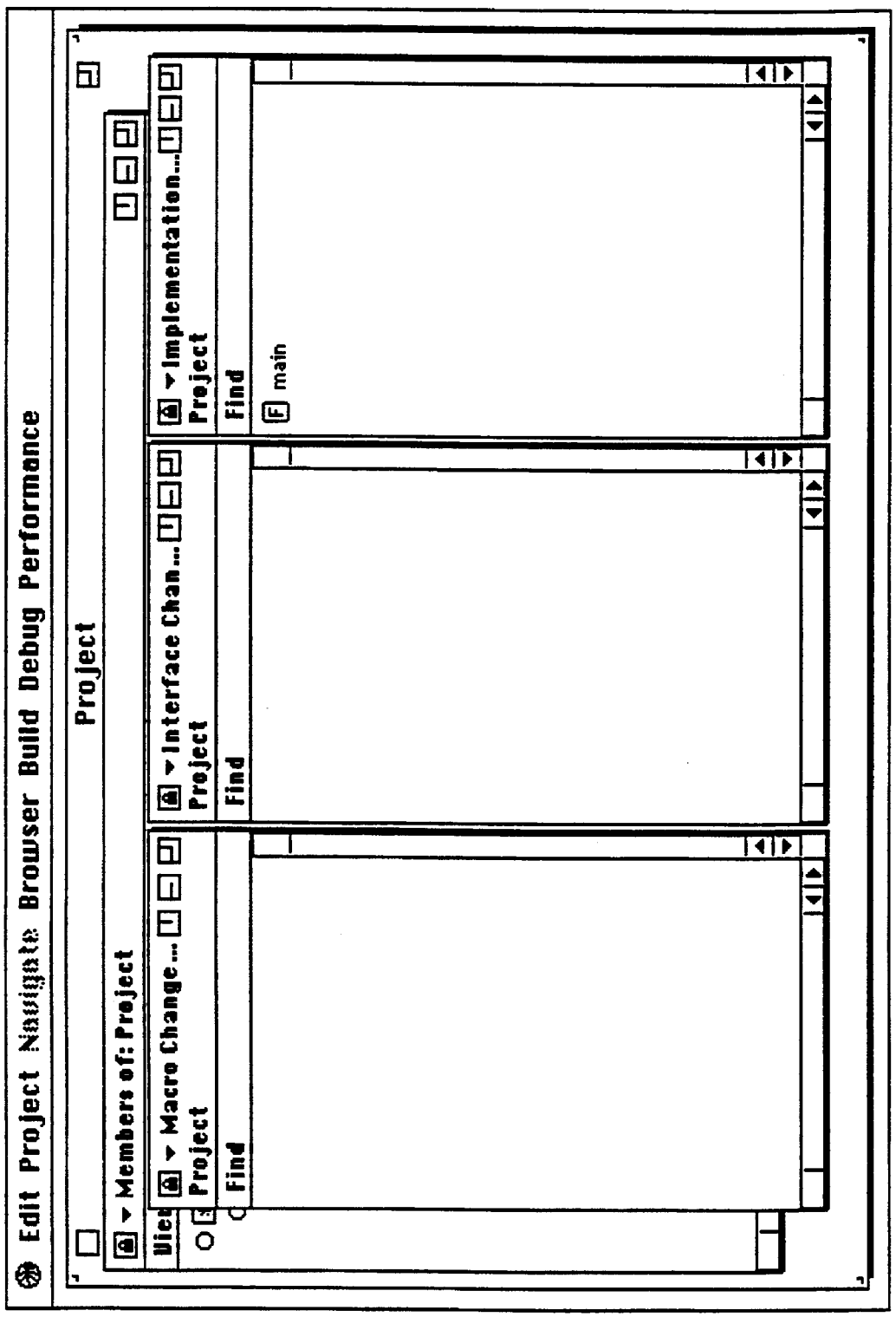
Figure 18:
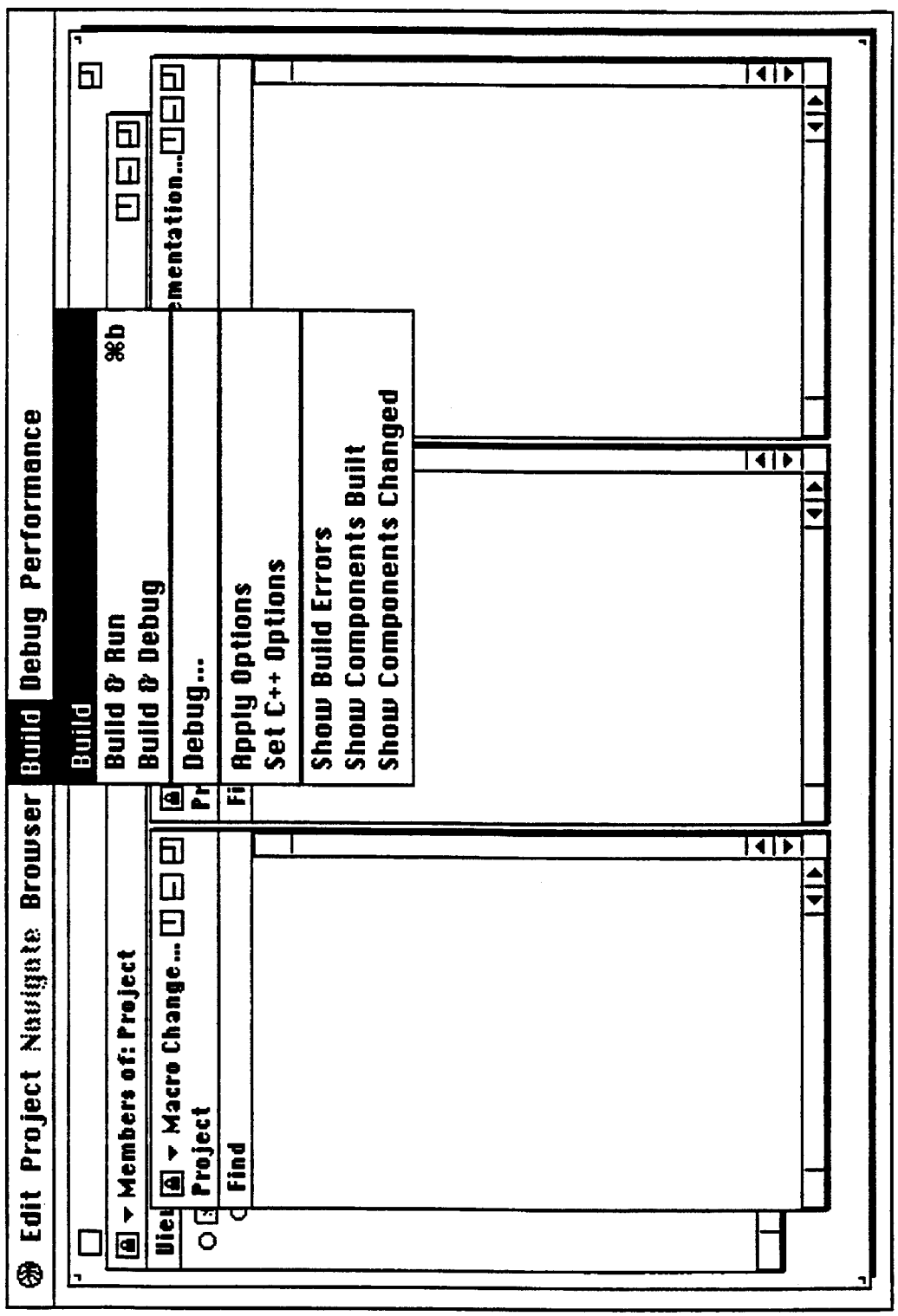

FIGS. 15 to 18 illustrated some of the screens displayed in the process of editing a component. FIG. 15 shows the display of the source code of an Implementation of a function called "main". In FIG. 16, the function "main" has been edited by changing numberDisks from "7" to "9". If the programmer now chooses Show Components Changed from the Build menu shown in FIG. 17, a browser like that shown in FIG. 18 appears. In the "Implementation Changes" viewer (on the right), the function "main" is displayed indicating that it has been changed.

Object Oriented Linking

This description lists the important features of the HOOPS linking mechanism, then it provides background on the runtime environment of a preferred embodiment, and the HOOPS database to provide the context in which linking occurs. Finally, a discussion of component linkage, and the interaction of components with the HOOPS compiler, the HOOPS database, and the system loader is provided with reference to a preferred embodiment.

Linker Features

Linking occurs during the compilation process. There is no extra linking pass.

During a build, only newly compiled functions and data are re-linked.

During incremental development, some shared library space is traded for speed.

The compiler interacts with components and properties to produce all object code and other linking information.

When a program is ready for release, a "publish" step will remove extra space and information used during incremental development, and separate the application from HOOPS.

The linker is extensible because:
1) the compiler may specify new fixups that the linker doesn't normally handle; and
2) new classes of loadModules may be used A suspended program may be modified and then resume execution without being reloaded. (Some changes will require a reload.

BACKGROUND

The linker operates inside HOOPS, and creates files that are used by the loader. To understand the linker mechanism, it is important to understand the unique aspects of both the runtime system and HOOPS.

An executable file interacts with the runtime much differently than in other runtime systems. Normally, a loader program must understand the executable file format. The executable file has known fields that describe various aspects of the program such as the amount of memory needed, the address of main, any relocation information if that is needed at load time, and any debugger information that is packaged in the executable. In a runtime of a preferred embodiment, the loader interacts with the executable file through an abstract TLoadModule class interface. The TLoadModule provides protocols for all the loading operations. For example, operations such as specifying memory requirements, building meta data information, and linking with other shared libraries are all provided by methods of TLoadModule. With this approach, there can be many different ways in which a load module can respond to the loading requests.

The runtime definition provides shared libraries, and allows for cross-library calls to be resolved at load time. Since libraries may be loaded at any memory location, all code must be either position independent, or must be patched at load time. In addition to position independent code, calls to other shared libraries must be resolved at load time. This is because the static linker does not know what the location, or the relative offset, of the external library will be in memory.

Figure 19:
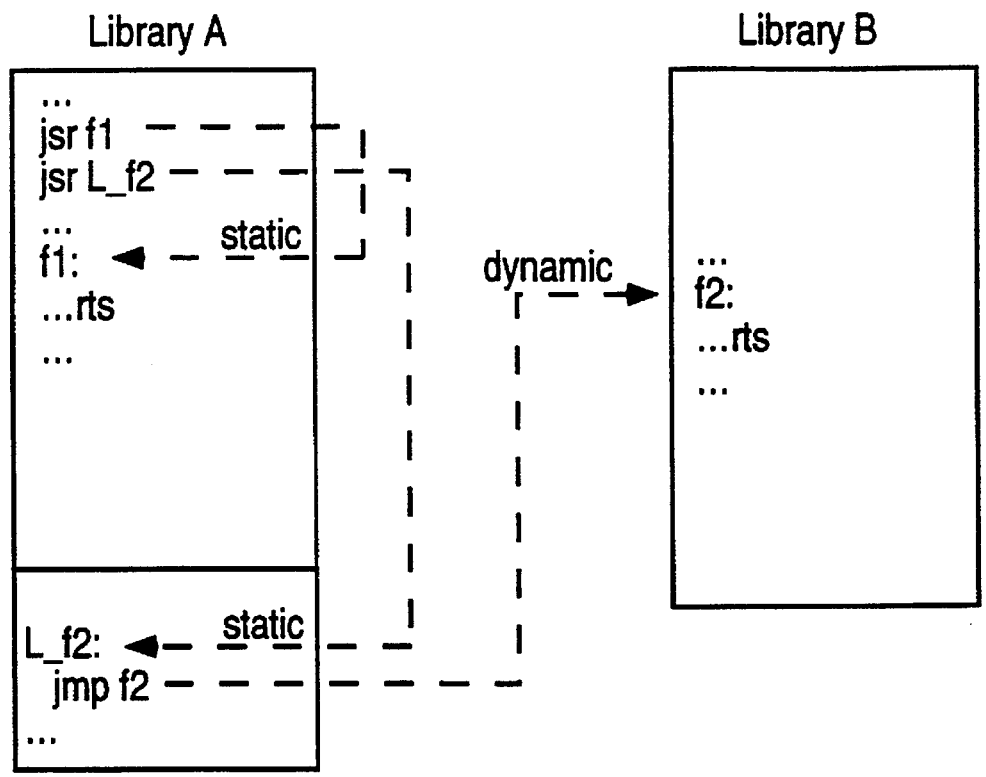
FIG. 19 illustrates an internal and cross-library call in accordance with a preferred embodiment.

While each TLoadModule class may implement cross-library calls in many different ways, the standard method is to jump through a linkage area that is patched at load time. The linkage area serves as an indirect jump table between libraries. An external call will JSR to the linkage area, and the linkage area will then JMP to the called function. Internal calls can JSR directly to the called function. An example of an internal and cross-library call is shown in FIG. 19 and described below.

The call to f1( ) 1900 is an internal call, so the JSR goes directly to f1( ) 1910. The call to f2( ) 1920 is a cross-library call; therefore, the call goes to the external linkage area 1930 that is patched at load time.

The HOOPS environment also provides a unique context for the linker. A program is represented as a collection of components. Each component has an associated set of properties. During the compilation of each component, the compiler will generate and store properties applicable to that component. The HOOPS build process orders the building of components so that all interfaces (declarations) are compiled before implementations (definitions).

A HOOPS project may consist of several library components. All source components are members of one of these library components. Each library component represents a shared library build.

Overview

To support incremental linking, and allow a final application to be as small and fast as possible, two different types of load modules are created. During development, HOOPS generates and modifies a TIncrementalLoadModule. There is a second load file, TStandardLoadModule, that is created when publishing applications.

A preferred embodiment discloses an approach for building and updating code during development. Converting a TIncrementalLoadModule into a TStandardLoadModule involves an extra "publish" step. This step will be much like a normal link step, in that each function or data item will be relocated and patched. However, external references are not resolved until load time.

Compiler Interaction

As the compiler generates code for a component, it passes the code to the object code property with a set of fixups that are used to patch the object code. Each compiled component has its object code property filled. The compiler uses an "object group" model. That is, a component can be made up of multiple types of object code. For example, a function could also have a private static data area associated with it, along with a destructor sequence for that static data area. A static data item could have a constructor and destructor sequence associated with it to initialize it at runtime.

For example, suppose the following component was compiled:

```
TFoo::Print( )
{
static int timesCalled = 0;
cout << "Hello world:" << timesCalled << "\n";
timesCalled++;
}
```

The compiler will generate two pieces of object code and associate them with the component TFoo::Print. There will be the object code for the function, and 4 bytes of private data for the static variable timesCalled.

This might look something like the following:

Object code property of TFoo::Print-code:

| 0x0000: | LINK | A6,#0 |
| 0x0004: | MOVE.L | A5,--(A7) |
| 0x0006: | PEA | L1 |
| 0x000A: | MOVE.L | <timesCalled>,--(A7) |
| 0x000E: | PEA | L2 |
| 0x0012: | MOVE.L | cout,--(A7) |
| 0x0016: | BSR | <operator<<(char*)> |
| 0x001C | ADDQ.L | #8,A7 |
| 0x001E: | MOVE.L | D0,--(A7) |
| 0x0020: | BSR | <operator<<(int)> |
| 0x0026: | ADDQ.L | #8,A7 |
| 0x0028: | MOVE.L | D0,--(A7) |
| 0x002A: | BSR | <operator(char*)> |
| 0x0030: | ADDQ.L | #8,A7 |
| 0x0032: | ADDQ.L | #1,<timesCalled> |

-continued

| 0x0034: | UNLK | A6 |
| 0x0036: | RTS | |
| L1 | DB | "\n" |
| L2 | DB | "Hello world:" |

Object code property of TFoo::Print - data:
00000000:     0000 0000

Along with the object code, the compiler will specify different fixups that must be applied as the code is relocated. These might look something like:

reference to timesCalled @ offset 0x0c reference to cout @ offset 0x14 reference to ostream::operator<<(const char *) @ offset 0x18 reference to ostream::operator<<(int) @ offset 0x22 reference to ostream::operator<<(const char *) @ offset 0x2c reference to timesCalled @ offset 0x34

Notice that the fixups may specify references to the other pieces of objects associated with this same component (the private static variable timesCalled), or to other components (such as cout).

When the compiler has completely specified the full set of objects and fixups associated with a component, the object code property relocates all of its pieces, and links itself at the same time. There is no second link pass performed after all the components are compiled. As each component is compiled, it is also fully linked.

Fixup Lists

Figure 20:
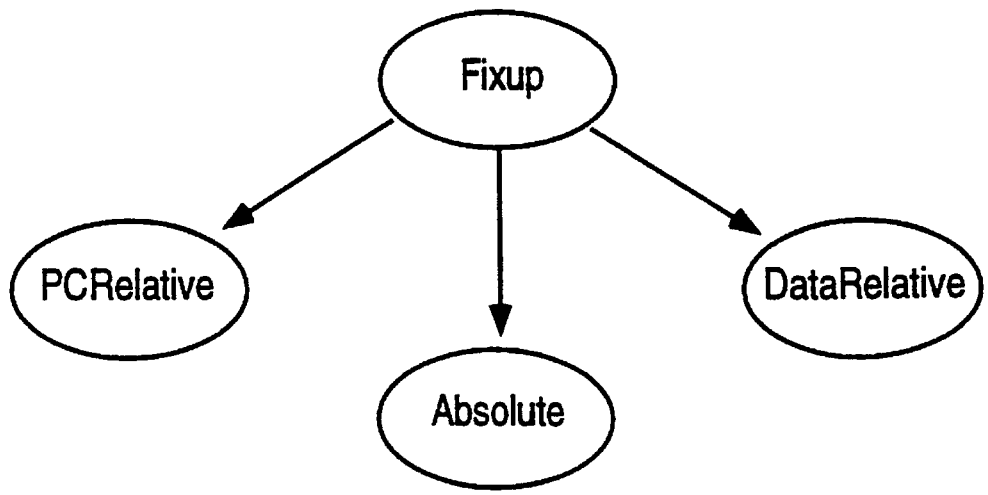
FIG. 20 illustrates a set of fixup classes in accordance with a preferred embodiment.

Linking is essentially a matter of iterating through the list of fixups and patching the code in an appropriate manner. Different types of fixups are specified through a class hierarchy, with each fixup knowing how to calculate the patch value. For example, a pc-relative fixup knows that it must calculate the difference between the address of its location, and the component which it references. An absolute fixup knows that it must delay calculations until load time. While the linker specifies a set of fixup classes, new compilers may specify new types of fixups. FIG. 20 illustrates a set of fixup classes in accordance with a preferred embodiment.

Address Calculation

The main problem with linking each component as it is compiled is that some components it references may have not yet been compiled.

Each source component is a member of exactly one library component. Associated with each library component is a load module property. The load module property works as the clearing house for all components that belong to the shared library. As a fixup prepares to calculate a patch value, it queries the load module property for the address of a component. The load module property checks to see if the component has been compiled. If it has, then it returns the address of the component. However, if the component has not yet been compiled, the load module property performs two actions depending on the type of the component.

If the type of the component is a data component, then it just returns a constant address. If the type of the component is a function component, then it creates a linkage area for that function, and returns the address of the linkage area.

Object Placement

As mentioned before, as each component is compiled, it is allocated a position in the shared library. As this is done, some extra work must be done so that all references are consistent.

If the component is a data component, all its clients are notified of the position. Some clients may have initially been linked with temporary addresses, so this process cleans up all the clients and provides them with the right address. If the component is a function component, then the linkage area for that function is updated with the new address. Notice that this two style approach provides indirect access to functions, and direct access to data.

In addition, extra space is allocated so that future updates of the object code has a higher probability of being able to use the same area. Tradeoffs between space and build times can be made as appropriate to the particular environment.

Linkage Area

Figure 21:
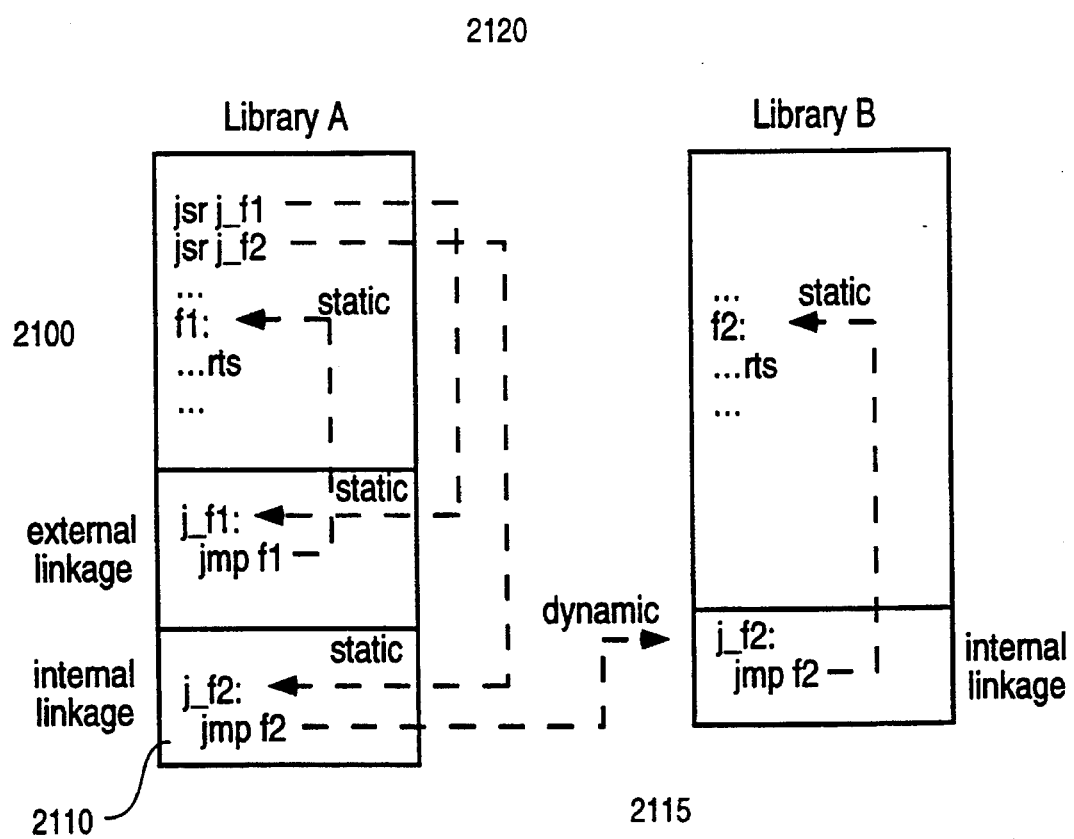
FIG. 21 illustrates a linkage area in accordance with a preferred embodiment.

As mentioned above, when the load module property is asked for the address of a function, it will give the address of the linkage area. This means that every function reference is indirect. FIG. 21 illustrates a linkage area in accordance with a preferred embodiment.

Notice that not only the internal library calls pass indirectly through the internal linkage area, but cross-library calls to functions go indirectly through a library's internal linkage area (i.e.: the call to f2 in Library B, 2100, 2110, 2115, 2120). This must be done so that f2 may change position without updating both its internal and external clients, and also for consistency so that items such as function pointers work correctly. In addition, all virtual table function pointers will also point to the internal linkage area.

Any functions that are referenced, but not defined, will point to a common Unimplemented( ) function. Having all uncompiled functions point to Unimplemented( ), facilitates the load and run of partial applications without forcing the programmer to create stub functions.

Another benefit of having the internal linkage area is that it provides a bottleneck to all functions. During development, the internal linkage area can be useful for activities that require function tracing such as debugging or performance monitoring.

Incremental Linking

The previous discussion has laid the foundation for a detailed discussion of incremental linking. When a component is recompiled, the new component size is compared to the old component size to determine if the new component fits in the current location. If it will, then it is stored there, and the fixup list associated with the object is iterated. Linking is then complete.

If the object code for the new component must be relocated, then the old space is marked as garbage, and the new object code is relocated to a new area. Then the fixup list is iterated. If the component is a function, the linkage entry is updated. Linking is then complete. However, if the component is a data item, then the component must iterate over the list of clients and update their references to this component. Linking is then complete for the data.

Notice that the initial link and incremental link follow the exact same steps. The only extra step done in incremental updates is handling the case when a data item must change location.

Object Code Storage

The object code and load module property are normal component properties, and as such, are stored like all other properties in the HOOPS database. However, the object code property describes the object code, but does not contain the actual bits. The actual bits are stored in segments owned by the load module property. The load module property maintains four different segments. These segments include: code, uninitialized data, initialized data, and linkage.

Figure 22:
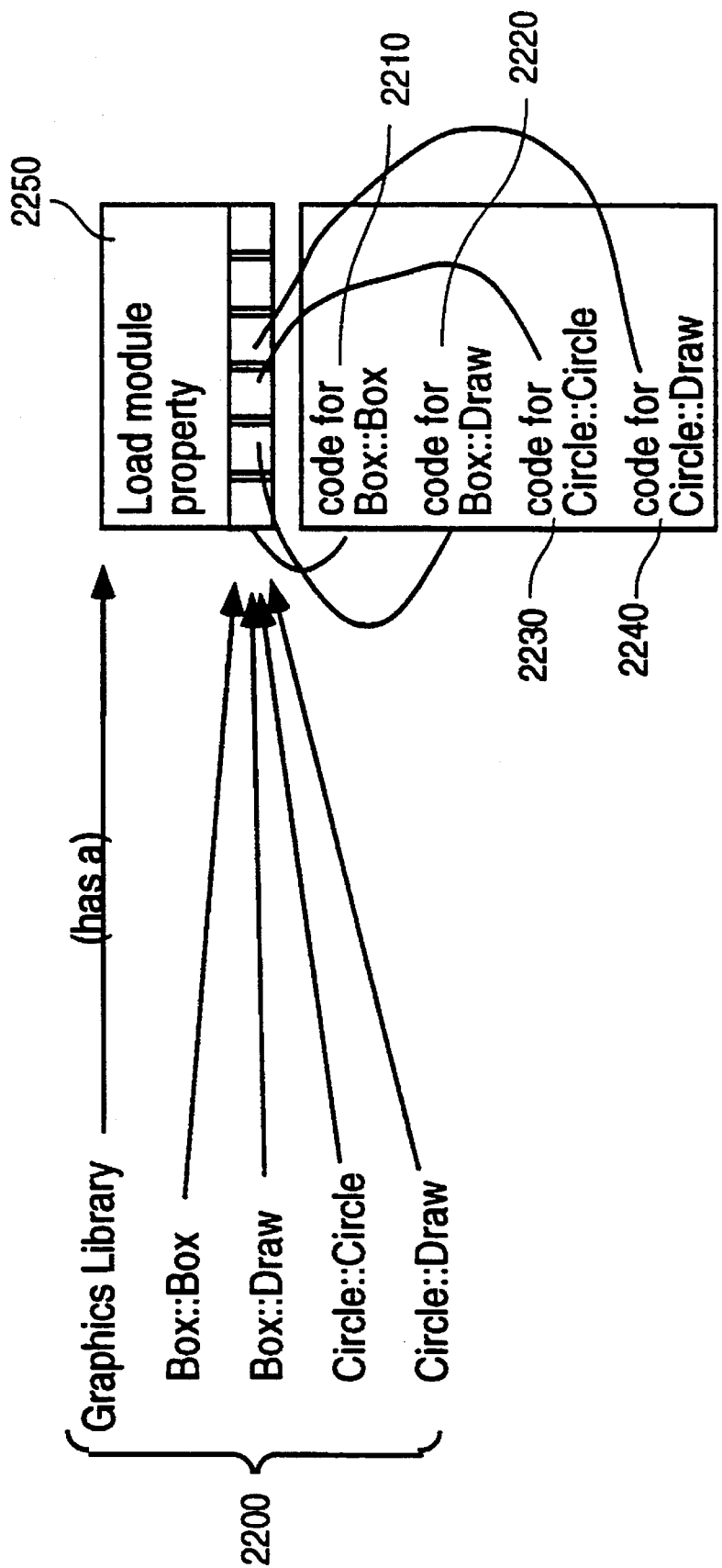
FIG. 22 illustrates the storage of object code in accordance with a preferred embodiment.

FIG. 22 illustrates the storage of object code in accordance with a preferred embodiment. Each of the functions (here illustrated as members of a graphic class box) 2200 has an associated load module property 2250 containing the individual object code associated with the graphic objects 2210, 2220, 2230 and 2240. Since all code is linked as it is compiled, and support is provided for changing and incremental building, the load module property maintains a map of all the objects allocated in each segment. It also tries to keep extra space available for growth. This extra space wastes some virtual memory space, but does not occupy backing store or real memory. If during the process of repeatedly changing and building an application, the extra space is exhausted, additional space will be allocated, affected segments must be relocated, and all references into and out of that segment must be updated. In addition, no backing store or virtual memory is allocated for the uninitialized data segment. This area will be created and initialized in the loaded application.

Figure 23:
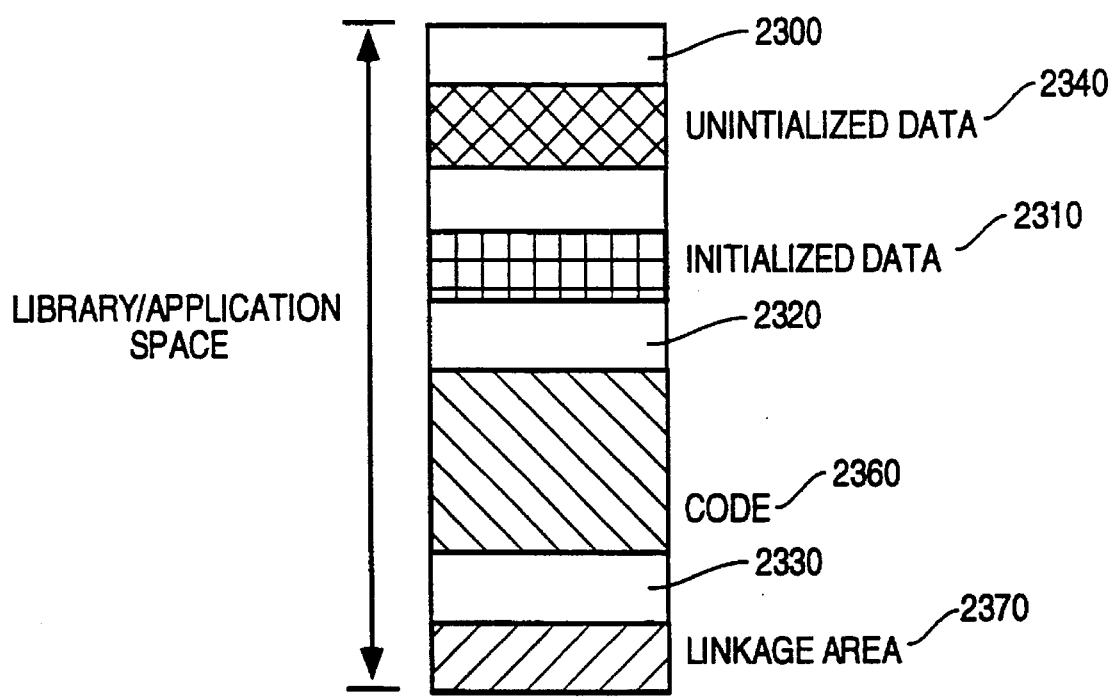
FIG. 23 illustrates a loaded library in accordance with a preferred embodiment.

FIG. 23 illustrates a loaded library in accordance with a preferred embodiment. The white sections 2300, 2310, 2320 and 2330 represent free space. Four sections are provided for uninitialized data 2340, initialized data 2350, code 2360 and a linkage area 2370. In HOOPS, the segments have no spatial relationship. Linking uses what will be the loaded relationship, not the relationship that they might have within HOOPS itself.

Loading

To run a program, the loader must be given a streamed TLoadModule class. During program building, a streamed TLoadModule class is created. When loaded, it loads the segments created in HOOPS. The segments are shared between the loaded application and HOOPS. This provides two benefits: first, it greatly reduces the amount of copying that must be done, and second it allows for incremental updates while the program is loaded.

Figure 24:
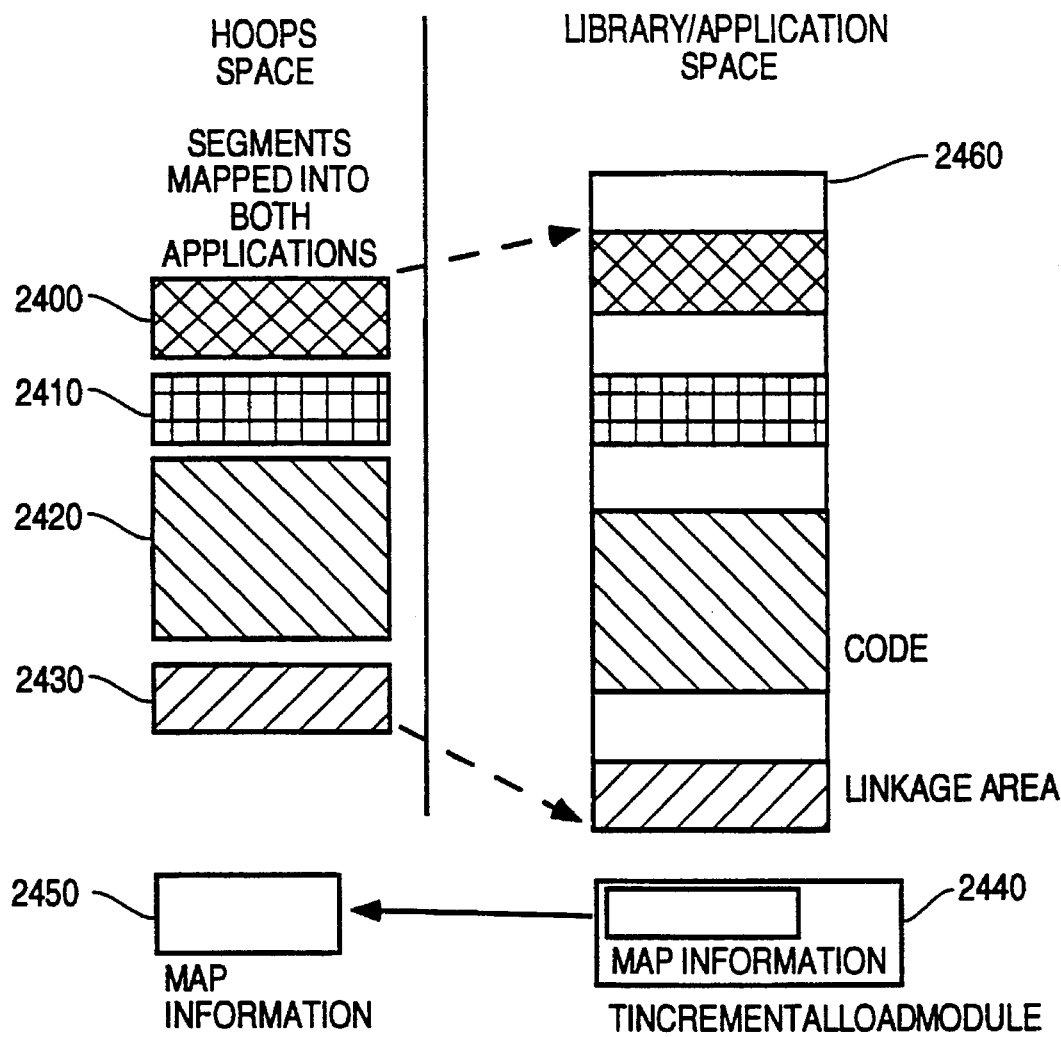
FIG. 24 is a memory map of a load module in accordance with a preferred embodiment.

Streams must be written from start to finish, since the loader requires a streamed TLoadModule class, the TIncrementalLoadModule attempts to reduce the amount of information streamed. This means that for most changes in a program, the TIncrementalLoadModule will not have to be re-streamed. The TIncrementalLoadModule gets all the mapping information from HOOPS through the use of a cross-application shared memory heap. Otherwise, any change in data location, or function size would require a new TIncrementalLoadModule to be built and streamed. FIG. 24 is a memory map of a load module in accordance with a preferred embodiment. Label 2400 is an uninitialized data area, 2410 is an initialized data area, 2420 is the linkage area, and 2430 is the code area. These areas are mapped into the loaded application space 2460. The application uses the streamed load module 2440 to access the shared memory area containing the map information 2450.

Incremental Updates

Incremental linking facilitates modification of a loaded library without removing it from execution. This requires changes made in HOOPS to be reflected in the address space of the running application. This will be handled by loading the library as a shared segment. Any modifications made on the HOOPS side will be reflected on the running application side. Remember that on the HOOPS side, the segment is interpreted as a portion of the HOOPS database, on the application side, it is just a segment that contains object code.

The model for active program modification is as follows. The debugger first stops execution, modified functions are compiled, and located at different locations even if they fit in their current location, the internal linkage area is updated, and the program is continued. If a modified function was active on the stack, the old version will execute until the next invocation of that function. An alternative is to terminate the program or restart the program higher in the stack frame before all modified functions if active functions are modified.

Publishing a Program

When an application is published, the linker will copy all object code to a file outside of the database. As the segments are copied to an external file, the linker will relocate and patch all the functions. In addition, all internal calls will become direct calls, and the internal linkage area will be removed. Notice that this step is essentially a relink, the compiler is not involved.

```
Implementation details
Class Definitions
enum EObjectKind { kCode, kData, kStaticCtor, kStaticDtor };
class TObjectProperty : public TProperty {
public:
        TObjectProperty( );
        virtual ~TObjectProperty( );
//      Compiler Interface
        virtual void WriteBits(EObjectKind whichOne, LinkSize length,
                void* theBits, unsigned short alignment);
        virtual void AdoptFixup(EObjectKind whichOne, TFixup* theFixup);
//      Getting/Setting
        void*
        CopyBits(EObjectKind whichOne) const;
        LinkOffset GetOFFset(EObjectKind whichOne) const;
        LinkSize
        GetLength(EObjectKind whichOne) const;
        ELinkSegment
        GetLinkSegment(EObjectKind whichOne) const;
        Boolean
        Contains(EObjectKind whichOne) const;
        virtual EObjectKind GetPublicKind( ) const = 0;
//      Linking
        virtual void GetLocation(EObjectKind whichOne,
TLocation& fillInLocation) const;
        TIterator*CreateFixupIterator( ) const;
};
        The object code property delegates the fixup work to
individual fixup objects.
        class TFixup {
        public:
                void DoFixup(void* moduleBase) = 0;
        private:
                TComponent* fReference;
                long        fOffset;
        };
```

Derived from TFixup are the classes TPCRelativeFixup, TAbsoluteFixup, and TDataRelativeFixup. Each fixup class understands how to perform the appropriate patching for its type. This is completely different than the normal compiler/linker interaction where the linker must interpret different bits to decide what action to take. Another advantage of this approach is that a new compiler for a new architecture doesn't have to worry about a fixup type not being supported in the linker.

Reference Types

The linker must handle 4 types of references. They are code-to-code, code-to-data, data-to-code, and data-to-data. The way each type of reference is handled (for 68K) is described below:

```
Code-to-Code
Example:    Foo( );
```

The compiler handles this case in two different ways depending on the context. It can either go pc-relative to Foo( ), or it can load the address of Foo( ), and go indirect through a register. Any internal call can use either style. The linker will always report the address of the linkage area. Cross-library calls must use the load address of style. These will use absolute addresses that will be patched at load time.

```
Code-to-Data
Example:    gValue = 1;
```

The compiler will generate a pc-relative access to gValue. However, if gValue is in a different shared library, the compiler will automatically generate an indirection. The linker will catch the indirect reference and provide a local address which will be patched with the external address at load time.

```
Data-to-Code & Data-to-Data
Example (Data-to-Code):    void (*pfn)( ) = &Foo;
Example (Data-to-Data):    int& pi = i;
```

Since both of these references require absolute addresses, they will be handled during loading. The patching of data references at load time will be handled just like the patching of external references.

FIG. 25 shows what happens in each type of reference. If an external library references these same components, this library will receive several GetExportAddress( ) calls at load time. In response to the GetExportAddress( ), a library will return the internal linkage area address for functions, and the real address for data. This allows the functions to move around while the library is loaded.

Figure 26:
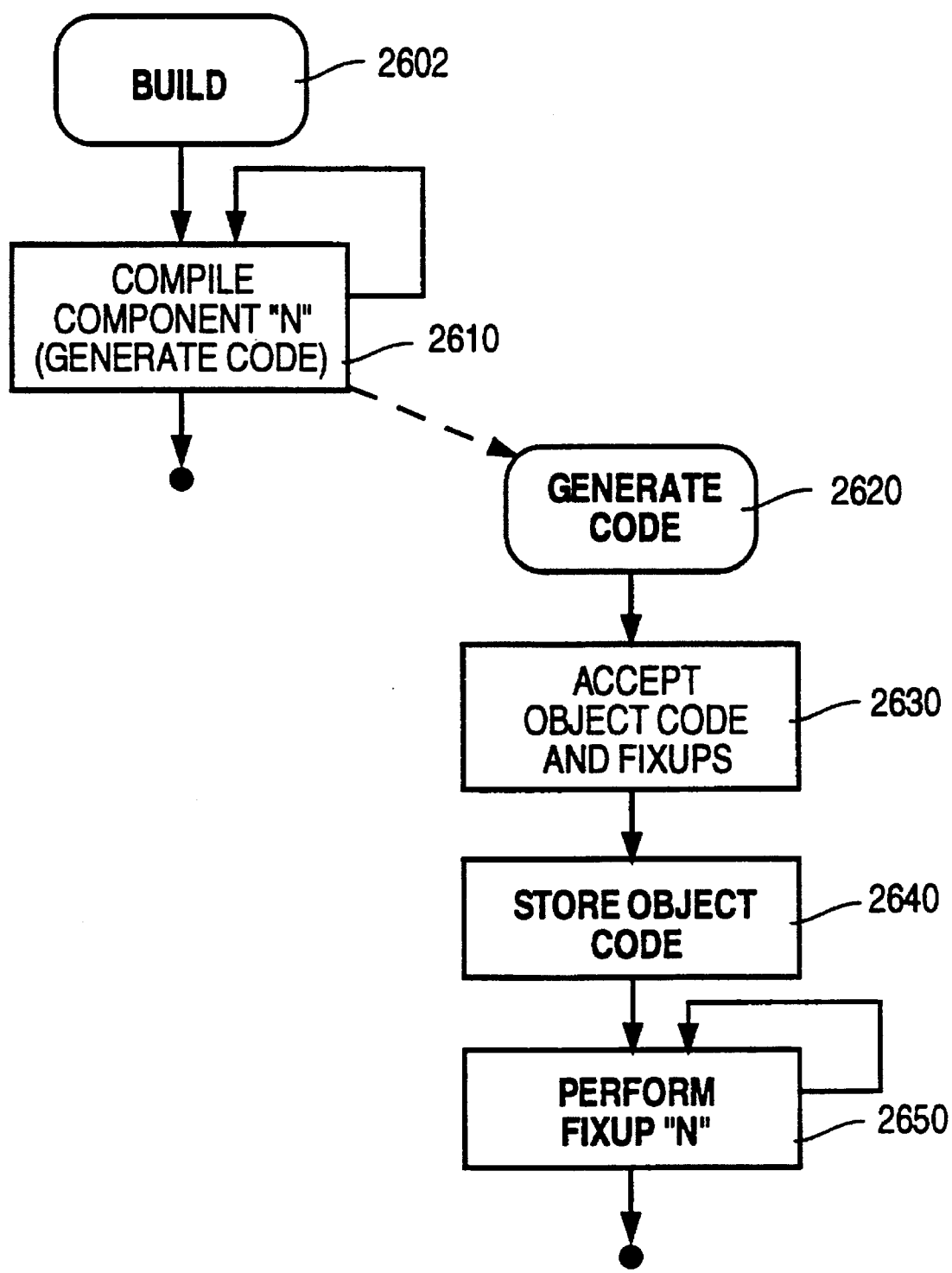
FIGS. 26, 27, 28 and 29 are flowcharts depicting the logic associated with linking in accordance with a preferred embodiment.

FIGS. 26, 27, 28 and 29 are flowcharts depicting the logic associated with linking in accordance with a preferred embodiment. FIG. 26 sets forth the overall flow of control. Processing commences at terminal 2602 as a build operation is initiated as described earlier and processing passes to function block 2610 for the compilation. Following the compilation, code is generated as indicated by terminal 2620. This processing is commenced at function block 2630 where object code is accepted and fixups are collected for a component. Then, at function block 2640, the object code is stored and in function block 2650, the fixups are performed for each newly changed object module. The processing associated with function block 2640 are detailed in FIG. 27, and the details of function block 2650 are detailed in FIGS. 28 and 29.

Figure 27:
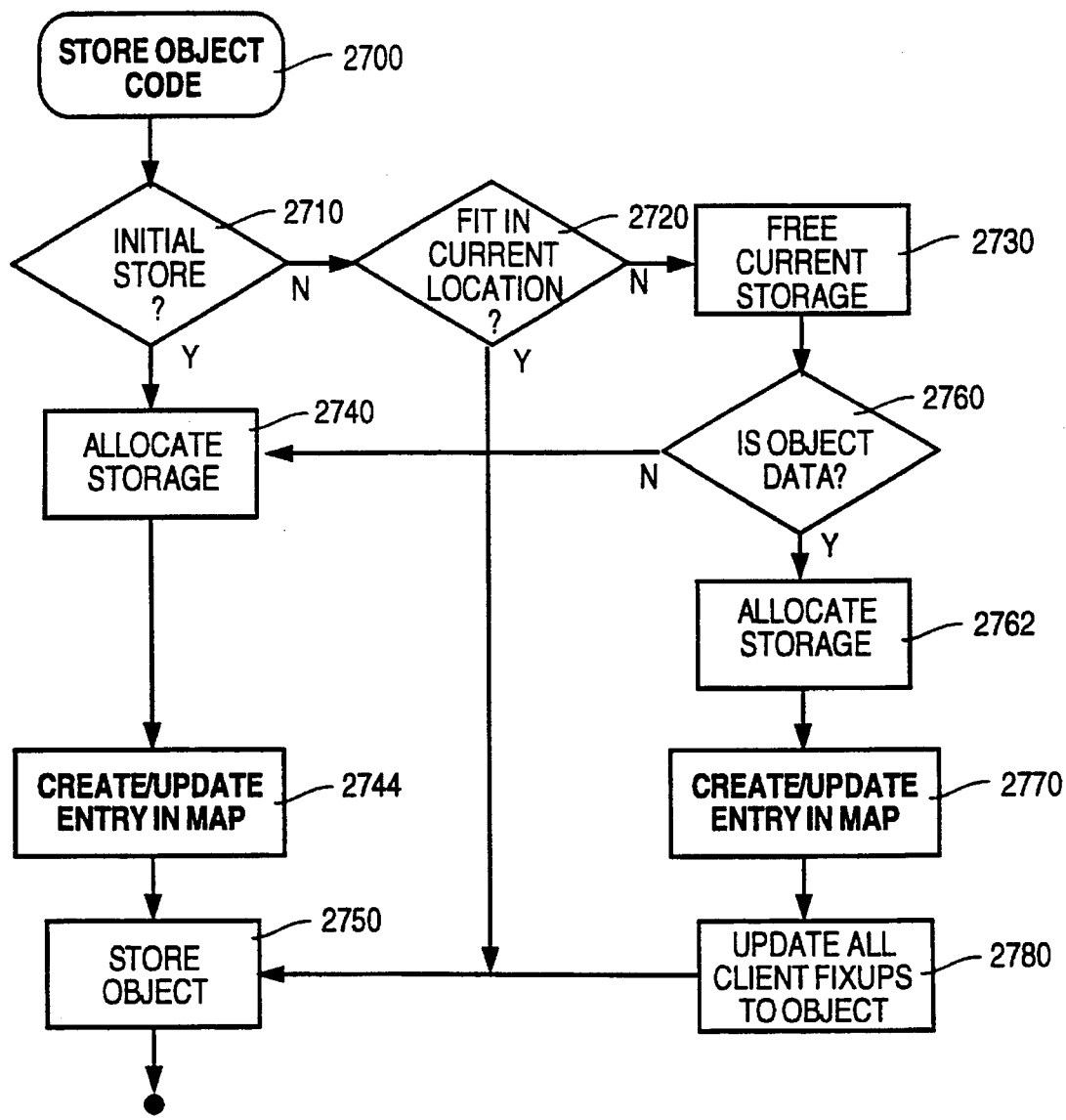

FIG. 27 is a flowchart setting forth the logic associated with storing the object code in accordance with a preferred embodiment. Processing commences at terminal 2700 and immediately passes to decision block 2710 to determine if this is an initial store operation. If so, then storage is allocated as shown in function block 2740, an entry is created or updated in the map as shown in function block 2744 and detailed in FIG. 29, and the object is stored in function block 2750. Updates occur if another component referenced this object before it was compiled. If this is an update operation as determined in decision block 2710, then a test is performed at decision block 2720 to determine if the code will fit in the existing location. If the code will fit, then the object is stored at function block 2750. If the code will not fit, then the current storage is freed at function block 2730, and another test is performed at decision block 2760 to determine if the data is object data. If so, then storage is allocated at function block 2762, an entry is created or updated in the map as shown in function block 2770 and detailed in FIG. 29, all client fixups to the object are performed as shown in function block 2780, and the object is stored as shown in function block 2750. If the data is not object data at decision block 2760, then storage is allocated at function block 2740, an entry is created or updated in the map as shown in function block 2744 and detailed in FIG. 29, and the object is stored as shown in function block 2750.

Figure 28:
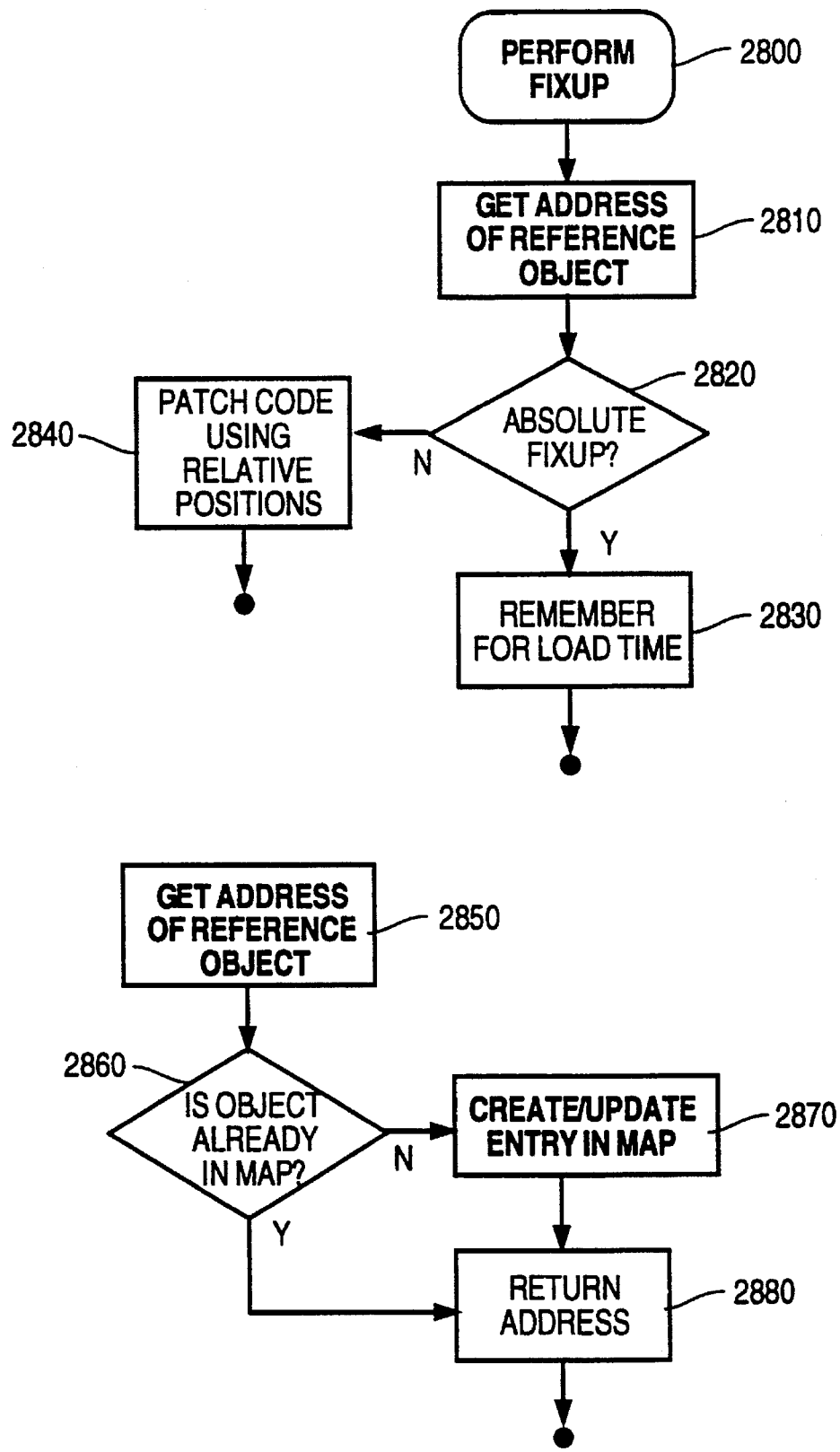

FIG. 28 sets forth the detailed logic of the fixup processing and the processing associated with obtaining an address of a reference object. Processing for performing a fixup is initiated at terminal 2800 and immediately passes to function block 2810 to get the address of a reference object. Then at decision block 2820, a test is performed to determine if an absolute fixup is necessary. If so, then at function block 2830 the absolute fixup is noted for a load operation. If not, then patch the code using relative positions as shown in function block 2840. The get address of reference object processing commences at function block 2850, and an immediate test is performed at decision block 2860 to determine if an object is already in the map. If so, then the address is returned at function block 2880. If not, then an entry is created or updated in the map as shown in function block 2744 and detailed in FIG. 29, then the address is returned at function block 2880.

Figure 29:
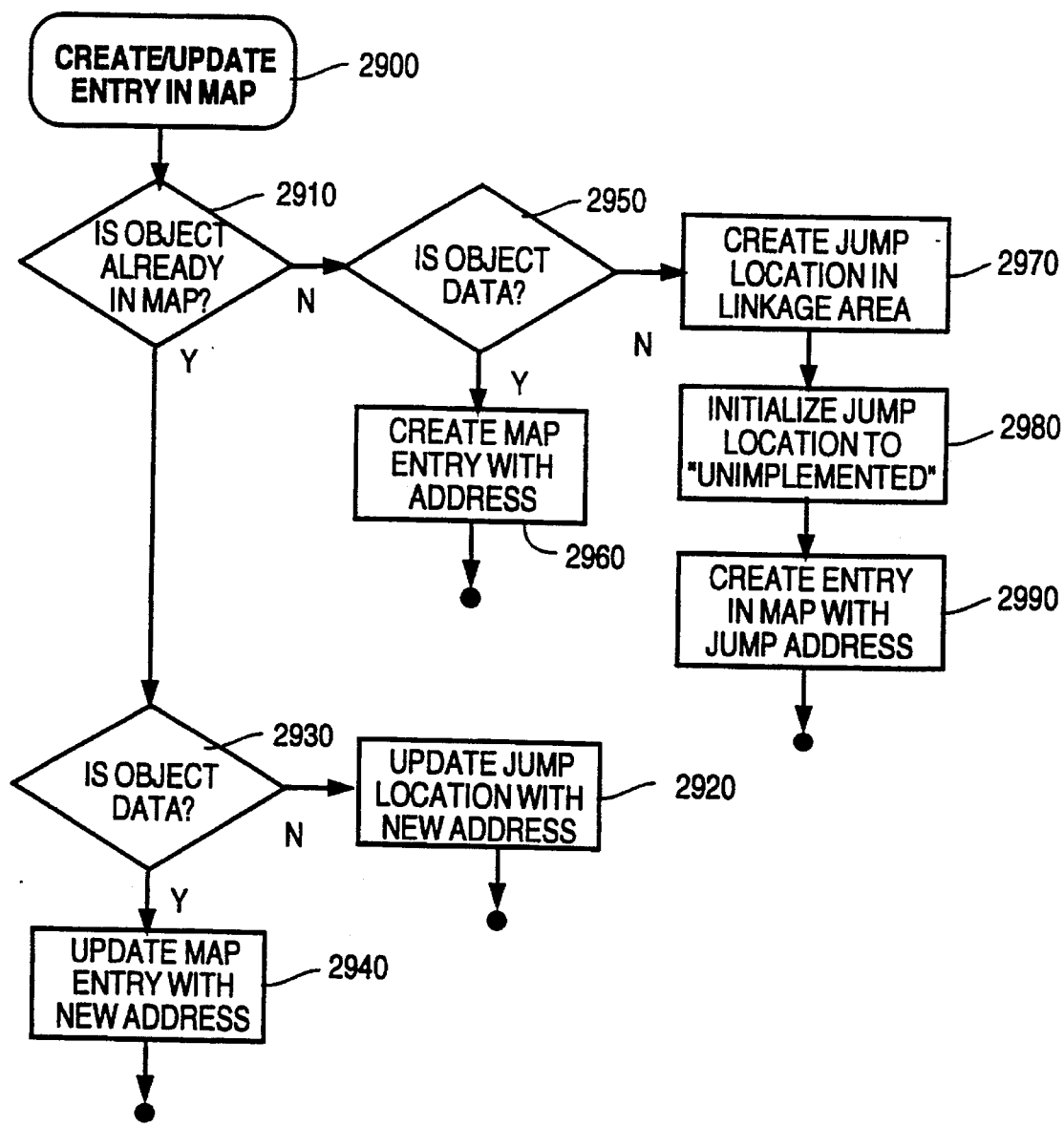

FIG. 29 is a flowchart setting forth the detailed logic of creating or updating an entry in a map in accordance with the subject invention. Processing commences at terminal 2900 and immediately passes to decision block 2910 to determine if an object is already in the map. If an object exists, then a test is performed at decision block 2930 to determine if the object is data. If the object is data, then the map is updated with the new address as shown in function block 2940. If not, then the jump location is updated with the new address as shown in function block 2920. If the object is not already in the map, then another test is performed at decision block 2950 to determine if the object is data. If the object is data, then a map is created with the appropriate address as shown in function block 2960. If not, then a jump location is created in the linkage area as shown in function block 2980 to a later defined location, and an entry is placed in the map with the linkage area address.

While the invention has been described in terms of a preferred embodiment in a specific programming environment, those skilled in the art will recognize that the invention can be practiced with modification within the spirit and scope of the appended claims.

Having thus described our invention, what we claim as new and desire to secure by Letters Patent is as follows:

1. A method for use on a computer system with a memory for incrementally linking a user-modified part of a computer program with previously compiled and linked parts of the computer program, the computer program being comprised of source code stored in the memory and the method comprising the steps of:

(a) receiving into the memory a user-created model of the computer program, the model comprising an ordered collection of components, each of the collection of components having a source code property referencing a portion of the source code in the memory, an object code property specifying a portion of the memory and client information identifying others of the collection of components which must be changed when the each component is changed;

(b) compiling and linking the source code portions in each of the collection of components to store executable object code in the memory portions specified by the object code properties of each of the collection of components;

(c) modifying a first portion of the source code in response to a user request and identifying one of the collection of components having a source code property which references the first source code portion;

(d) accessing the client information of the one component to identify others of the collection of components which must be changed and;

(e) concurrently compiling and linking the one component and all of the other components that must be changed to store new executable object code in the memory portions specified by the object code properties of the one component and the other components identified in step (d).

2. The method of claim 1, wherein the first source code portion comprises an interface portion for communicating with others of the collection of components and an implementation portion comprising a remainder of the first source code portion which does not communicate with others of the collection of components and wherein the one component includes an interface attribute, describing the interface portion, and an implementation attribute, describing the implementation portion, and wherein step (c) includes the step of (c.1) updating the implementation attribute when the implementation portion is modified in accordance with the user request and updating the interface attribute when the interface portion is modified in accordance with the user request; and wherein step (e) includes the steps of:

(e.1) examining the implementation attribute and the interface attribute to determine whether only the implementation portion was modified in step (c) and, (e.1.1) if so, concurrently compiling and incrementally linking only the one component, and (e.1.2) if not, concurrently compiling and incrementally linking the one component and all of the other components that must be changed.

3. The method of claim 2 wherein the first source code portion comprises inline source code and the one component further includes an inline attribute, and wherein step (c) includes the step of:

(c.1) updating the inline attribute when the inline source code is modified in accordance with the user modification request, and wherein step (e) includes the step of:

(e.2) examining the inline attribute to determine whether the inline source code was modified and, (e.2.1) if so, concurrently compiling and incrementally linking the one component and all of the other components that must be changed.

4. The method of claim 1, wherein the method further comprises the steps of:

(f) relocating the new executable object code of the one component from an old memory portion specified by the object code property of the one component to a new memory portion when the new executable object code does not fit into the old memory portion; and (g) updating the object code property of the component which has its new executable object code relocated in step (f) to specify the new memory portion.

5. The method of claim 4, wherein the new executable object code has a name and the one component includes a declaration attribute relating the new executable object code name to the memory portion holding the new executable object code and wherein the method further comprises the step of:

(h) updating the declaration attribute of the one component which has its new executable object code relocated in step (f) to specify the new memory portion.

6. The method of claim 5 wherein the computer system includes a symbol table stored in the memory, the symbol table relating the memory portion holding the new executable object code of the one component with the new executable object code name and wherein the method further comprises the steps of:

(i) updating the symbol table to specify the new memory portion of the new executable object code;

(j) informing the others of the collection of components which must be changed that the declaration attribute of the one component has been updated, and (k) concurrently compiling and incrementally linking the others of the collection of components which must be changed in accordance with the updated declaration attribute and the updated symbol table.

7. The method of claim 1 wherein the executable object code includes function object code that implements a function and wherein step (b) includes the step of:

(b.1) creating a linkage area in the memory for holding references to the function object code;

(b.2) storing executable object code that implements the function in a function memory portion and identifying the function memory portion by a memory reference in the linkage area; and wherein step (e) comprises the step of:

(e.3) compiling and linking calls to the function by using the memory reference in the linkage area to indirectly access the executable object code implementing the function.

8. The method of claim 7 wherein step (e) further includes the step of:

(e.4) determining whether the new executable object code fits in the memory portion specified by the object code property of the one component, and (e.4.1) if so, storing the new executable object code in the memory portion; and (e.4.2) if not, allocating a new memory portion and storing the new executable object code in the new memory portion; and (e.4.2.1) if the first source code portion includes function source code, updating the linkage area to reference the new memory portion.

9. The method of claim 1 wherein step (e) further includes the steps of:

(e.5) generating a set of fixups describing fixup operations to be performed on portions of the new executable object code as part of storing the new executable object code in the memory.

10. An apparatus for use on a computer system with a memory for incrementally linking a user-modified part of a computer program with previously compiled and linked parts of the computer program, the computer program being comprised of source code stored in the memory and the apparatus comprising:

(a) means for storing in the memory a user-created model of the computer program the model comprising an ordered collection of components, each of the collection of components having a source code property referencing a portion of the source code in the memory, an object code property specifying a portion of the memory and client information identifying others of the collection of components which must be changed when the each component is changed;

(b) first means for compiling and linking the source code portions in each of the collection of components to store executable object code in the memory portions specified by the object code properties of each of the collection of components;

(c) means responsive to a user request for modifying a first portion of the source code and for identifying one of the collection of components having a source code property which references the first source code portion;

(d) means for accessing the client information of the one component to identify others of the collection of components which must be changed; and (e) second means, responsive to the means for accessing, for concurrently compiling and linking the one component and all of the other components that must be changed to store new executable object code in the memory portions specified by the object code properties of the one component and the other components identified by the accessing means.

11. The apparatus of claim 10 wherein the source code in the modified component comprises an interface portion for communicating with the client components and an implementation portion comprising a remainder of the source code in the modified component which does not communicate with the client components and wherein the modified component includes an interface attribute, describing the interface portion, and an implementation attribute, describing the implementation portion, and wherein the user request receiving and processing means includes:

means responsive to a modification of the implementation portion for updating the implementation attribute;

means responsive to a modification of the interface portion for updating the interface attribute; and wherein the second compiling and linking means is responsive to the interface attribute and to the implementation attribute for concurrently compiling and incrementally linking only the modified component when only the implementation portion is modified and for concurrently compiling and incrementally linking the modified component and the client components when the interface portion is modified.

12. The apparatus of claim 11 wherein the source code of the modified component comprises inline source code and the modified component further includes an inline attribute, and wherein the user request receiving and processing means includes:

means responsive to a modification of the inline source code for updating the inline attribute, and wherein the second compiling and linking means includes:

means responsive to the inline attribute for concurrently compiling and incrementally linking the modified component and the client components when the inline source code is modified.

13. The apparatus of claim 10 further comprising:

means for relocating the new executable object code of the one component from an old memory location referenced by the object code property of the modified component to a new memory location when the new executable object code does not fit into the old memory location; and means responsive to a relocation of the new executable object code for updating the object code property of modified component to specify the new memory location.

14. The apparatus of claim 13 wherein the new executable object code has a name and the modified component includes a declaration attribute relating the new executable object code name to the memory location holding the new executable object code and wherein the apparatus further comprises:

means responsive to a relocation of the new executable object code for updating the declaration attribute of the modified component to specify the new memory location.

15. The apparatus of claim 14 wherein the computer system includes a symbol table stored in the memory, the symbol table relating the memory location holding the new executable object code of the modified component with the new executable object code name and wherein the apparatus further comprises:

means for updating the symbol table to specify the new memory location of the new executable object code;

means for informing the client components that the declaration attribute of the modified component has been updated, and third means for concurrently compiling and incrementally linking the client components in accordance with the updated declaration attribute and the updated symbol table.

16. The apparatus of claim 10 wherein the executable object code includes function object code that implements a function and wherein the first compiling and linking means includes:

means for creating a linkage area in the memory for holding references to the function object code;

means for storing executable object code that implements the function in a function memory portion and identifying the function memory portion by a memory reference in the linkage area; and wherein the second compiling and linking means comprises:

means for compiling and linking calls to the function by using the memory reference in the linkage area to indirectly access the executable object code implementing the function.

17. The apparatus of claim 16 wherein the second compiling and linking means further includes:

means for determining whether the new executable object code fits in the memory location specified by the object code property of the modified component, and means cooperating with the determining means for storing the new executable object code in the memory location when the new executable object code fits in the memory location specified by the object code property of the modified component; and means cooperating with the determining means for allocating a new memory location and storing the new executable object code in the new memory location when the new executable object code does not fit in the memory location specified by the object code property of the modified component; and means responsive to the inclusion of function source code in the source code of the modified component for updating the linkage area to reference the new memory location.

18. The apparatus of claim 10 wherein the second compiling and linking means further includes means for generating a set of fixups describing fixup operations to be performed on portions of the new executable object code as part of storing the new executable object code in the memory.

* * * * *